US012739171B2

(12) United States Patent
Komavec Osojnik et al.

(10) Patent No.: US 12,739,171 B2
(45) Date of Patent: Sep. 15, 2026

(54) SYSTEM AND METHOD FOR DYNAMIC FILTERING AND TUNING OF IT CONFIGURATION DATA

(71) Applicant: E.S.I. SOFTWARE LTD, Givath Shmuel (IL)

(72) Inventors: Mojca Komavec Osojnik, Borovnica (SI); Bostjan Kaluza, Ljubljana (SI); Michael Noam, Rosh Haayin (IL); Oran Poney, Ofakim (IL); Eyal Oz, Petah Tikva (IL); Alexander Sasha Gilenson, Givatayim (IL)

(73) Assignee: E.S.I. SOFTWARE LTD, Givath Shmuel (IL)

( * ) Notice: Subject to any disclaimer, the term of this patent is extended or adjusted under 35 U.S.C. 154(b) by 106 days.

(21) Appl. No.: 19/000,735

(22) Filed: Dec. 24, 2024

(65) Prior Publication Data

US 2026/0180854 A1 Jun. 25, 2026

(51) Int. Cl.

| | |
|---|---|
| ***H04L 41/0816*** | (2022.01) |
| ***H04L 41/0803*** | (2022.01) |
| ***H04L 41/0823*** | (2022.01) |
| ***H04L 41/0866*** | (2022.01) |
| *G06F 11/30* | (2006.01) |
| *G06F 11/34* | (2006.01) |

(52) U.S. Cl.

CPC ...... *H04L 41/0816* (2013.01); *H04L 41/0803* (2013.01); *H04L 41/0823* (2013.01); *H04L 41/0866* (2013.01); *G06F 11/3051* (2013.01); *G06F 11/3466* (2013.01); *G06F 2201/86* (2013.01)

(58) Field of Classification Search

CPC ............ H04L 41/0816; H04L 41/0823; H04L 41/0803; H04L 41/0866; G06F 2201/86; G06F 11/3466; G06F 11/3051

See application file for complete search history.

(56) References Cited

U.S. PATENT DOCUMENTS

| | | | | |
|---|---|---|---|---|
| 9,497,136 | B1 * | 11/2016 | Ramarao | G06F 9/45533 |
| 9,524,465 | B2 * | 12/2016 | Gilenson | H04L 41/0853 |
| 2015/0113008 | A1 * | 4/2015 | Deshmukh | H04L 41/5074 707/754 |
| 2021/0366268 | A1 * | 11/2021 | Jain | G08B 29/185 |
| 2024/0250885 | A1 * | 7/2024 | Kantal | H04L 41/5096 |

* cited by examiner

*Primary Examiner* — Umar Cheema
*Assistant Examiner* — Adam A Cooney
(74) *Attorney, Agent, or Firm* — Soroker Nordman Riba

(57) ABSTRACT

A method of noise reduction, including: collecting configuration data with agents from configuration items, transmitting the collected configuration data to a server for processing, blocking receipt of selected configuration data by a server load protection module to protect the server from overload, storing the configuration data at the server in a storage, processing the configuration data with a batch noise detection module that identifies noise in the configuration data; the batch noise detection module deduces rules based on the identified noise and stores the rules in a data knowledge repository, receiving a user query from a user using a front-end module, analyzing the configuration data with an analytical module to transform the configuration data to be aligned with the user query, responsive to the analysis applying a runtime noise detection module to identify and suppress transformed configuration data to remove irrelevant transformed configuration data.

20 Claims, 10 Drawing Sheets

Data Knowledge repository–rule examples

| SCOPE | NOISE CATEGORY | CREATED BY | STATUS | LAST MODIFIED |
|---|---|---|---|---|
| CI: Host 1<br>Env: Microsoft Windows 2019<br>Path: */Drivers/*<br>Parameter: ACCEPTSTOP | TOGGLING | Batch Noise Detection | Active | Batch Noise Detection on Dec-3-2023 |
| CI: Host 1<br>Env: IIS<br>Path: *<br>Parameter: * | STOP_COLLECTING | Batch Noise Detection | Pending Review | Batch Noise Detection on Jan-21-2024 |
| CI: *<br>Env:Microsoft Windows 2019<br>Path: OS/Installed Components/*<br>Parameter: * | STOP_COLLECTING | Batch Noise Detection | Inactive | John on Jan-21-2024 |
| CI: *<br>Env: Unix-os<br>Path: */Dynamic User Limits/max user processes<br>Parameter: DYNAMIC-VALUE | IGNORE | Michael | Active | Michael on Feb-1-2024 |
| CI: host1234<br>Env: Microsoft Windows 2008<br>Path: OS/Computer System Product/*<br>Parameter: * | STOP_COLLECTING | John | Active | Admin on Feb-3-2024 |

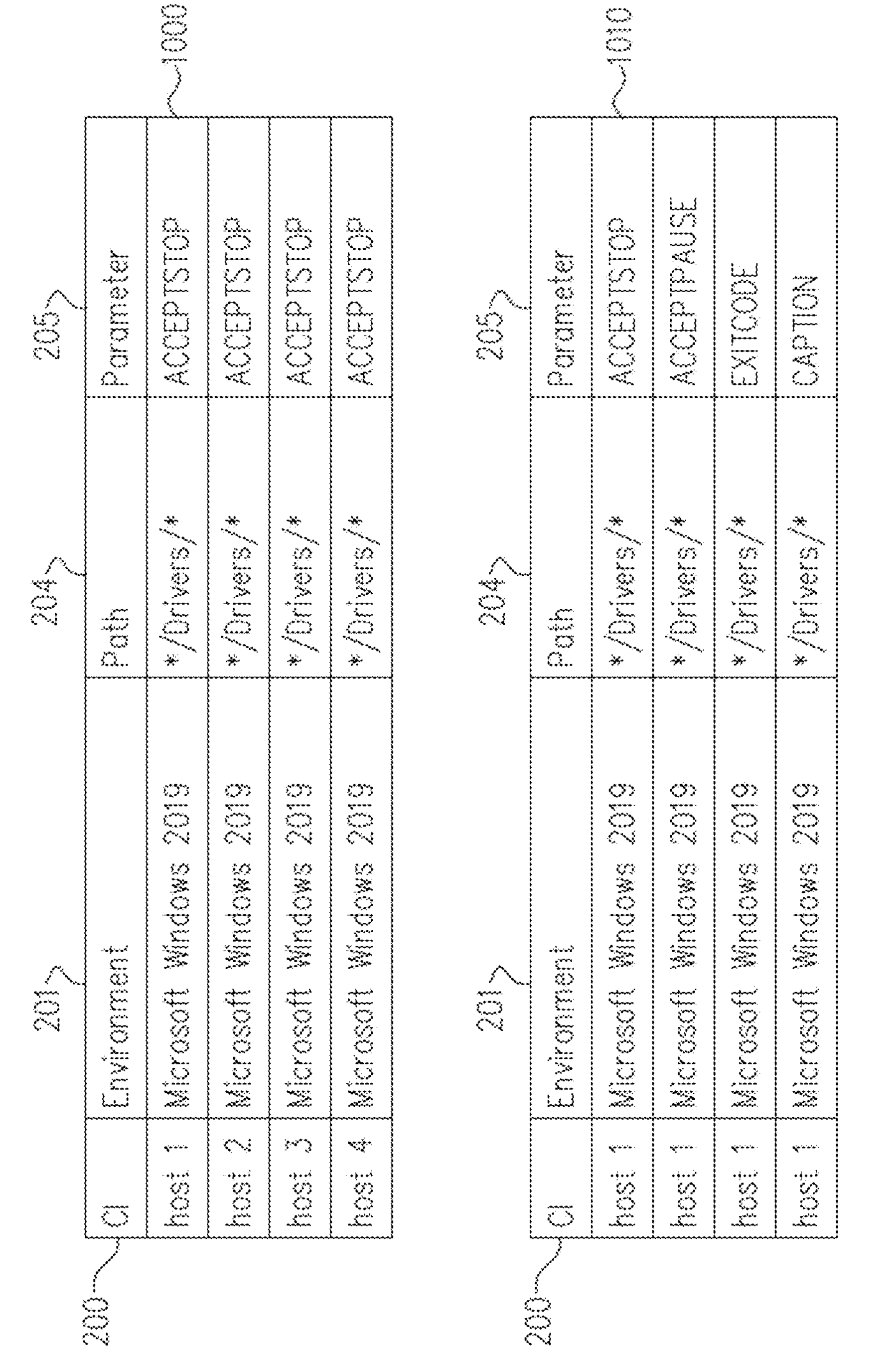

| CI | Environment | Path | Parameter |
|---|---|---|---|
| host 1 | Microsoft Windows 2019 | */Drivers/* | ACCEPTSTOP |
| host 2 | Microsoft Windows 2019 | */Drivers/* | ACCEPTSTOP |
| host 3 | Microsoft Windows 2019 | */Drivers/* | ACCEPTSTOP |
| host 4 | Microsoft Windows 2019 | */Drivers/* | ACCEPTSTOP |

| CI | Environment | Path | Parameter |
|---|---|---|---|
| host 1 | Microsoft Windows 2019 | */Drivers/* | ACCEPTSTOP |
| host 1 | Microsoft Windows 2019 | */Drivers/* | ACCEPTPAUSE |
| host 1 | Microsoft Windows 2019 | */Drivers/* | EXITCODE |
| host 1 | Microsoft Windows 2019 | */Drivers/* | CAPTION |

FIG. 10

SYSTEM AND METHOD FOR DYNAMIC FILTERING AND TUNING OF IT CONFIGURATION DATA

FIELD OF THE DISCLOSURE

The present disclosure relates to a system and method of filtering and tuning configuration data in an IT environment and more specifically, by performing dynamic filtering to reduce noise in the configuration data.

BACKGROUND OF THE DISCLOSURE

Modern information technology (IT) environments are composed of large networks of interconnected servers and associated components. These servers may be managed on-premise, in the cloud, or through a hybrid approach. Since they host critical business applications, effective monitoring and management of these IT environments are essential. These applications must be reliable and responsive to meet the expectations outlined in Service Level Agreements (SLAs). To ensure SLA compliance and address problems or incidents that may arise, organizations rely on processes like change management and problem management.

Change management involves planning, scheduling, implementation, and evaluation of changes within complex IT environments. A key aspect of this process is the analysis and prioritization of detected changes, as described in U.S. Pat. No. 9,524,465 to Gilenson et al. This analysis forms the basis for assessing the impact and relevance of changes. However, modern IT environments present significant challenges in managing these changes effectively, particularly due to the overwhelming volume of data generated.

The growing adoption of cloud infrastructures, containerized applications, and microservices has introduced unprecedented levels of dynamism, which exacerbate the challenges of managing configuration changes. Traditional methods often fail to scale in such environments, making advanced noise reduction mechanisms a necessity. Noise reduction mechanisms filter out irrelevant or "noisy" changes, allowing IT teams to focus on the changes that matter.

Noisy changes can stem from various sources, such as:

- Excessive granularity: For example, collecting multiple properties of a file and registering a change for each property.
- Irrelevant data collection: Capturing data from folders like logs or caches, which may not be meaningful.
- Context mismatch: Displaying data unrelated to a specific use case (e.g., showing database changes when only operating system changes are relevant).
- Dynamic environments: Frequent changes in cloud infrastructures, containers, and microservices.
- Aggressive monitoring tools: Tools that act too frequently, generating excessive data.

By implementing noise reduction mechanisms, organizations can significantly improve the quality and usability of configuration data. These mechanisms are particularly beneficial in environments with frequent changes, such as DevOps pipelines or CI/CD workflows, where managing configuration data efficiently is crucial to maintaining operational stability.

The system leverages adaptive learning techniques to ensure that noise reduction mechanisms evolve over time, refining their ability to detect and filter noise based on new patterns and feedback. This combination of automation and user-defined rules allows for customizable and scalable solutions that suit the needs of dynamic IT environments.

The benefits of these mechanisms extend beyond change management. By minimizing irrelevant changes, noise reduction contributes to streamlined IT operations, reducing alert fatigue in monitoring systems and enabling teams to focus on actionable insights. Additionally, the modular architecture of the system ensures scalability and high performance, making it suitable for managing configuration data across large, complex IT infrastructures.

Ultimately, this system enhances decision-making by presenting only the most relevant configuration changes, enabling IT teams to make faster, more informed decisions. It reduces cognitive load, improves resource utilization, and supports both automated and human-in-the-loop systems, ensuring operational stability and efficiency.

SUMMARY OF THE DISCLOSURE

An aspect of an embodiment of the disclosure, relates to a system and method for configuration risk intelligence in IT environments, aimed at identifying and filtering irrelevant or "noisy" configuration changes. IT environments often generate large volumes of configuration data, much of which may not be relevant for decision-making, creating inefficiencies and increasing cognitive load for users. The system improves the quality of configuration data by employing mechanisms to detect and filter noise at various stages of data collection and processing.

The system architecture includes agents installed on hosts or agents that are external to the hosts to collect configuration data, server modules to process and analyze the data, and a knowledge repository to store rules for identifying and managing noise.

Noise detection mechanisms are implemented both in bulk (batch processing) and in real time, using user-defined rules, pre-collection filters, and adaptive learning components. The learning components dynamically create and improve noise detection rules by analyzing historical data and user feedback.

By filtering irrelevant data, the system enhances decision-making, optimizes resource utilization, and supports reliable change management in IT environments, whether on-premise, cloud-based, or hybrid. The invention reduces the complexity of managing configuration data, improves algorithm performance, and ensures better compliance with service-level agreements (SLAs).

The system is particularly beneficial in dynamic environments with frequent changes, such as cloud infrastructure, microservices, and containerized systems, providing a scalable and intelligent solution for managing configuration risks.

There is thus provided according to an embodiment of the disclosure, a method of noise reduction in configuration data of an IT system, comprising:

- collecting configuration data from configuration items in a network of the IT system with agents from the configuration items;
- transmitting the collected configuration data to a server for processing;
- blocking receipt of selected configuration data by a server load protection module to protect the server from overload by hazardous content;
- storing the configuration data at the server in a long-term data storage;
- processing the configuration data with a batch noise detection module that identifies noise in the configuration data and suppresses non-desired configuration data; the batch noise detection module deduces rules based on the identified noise and stores the rules in a data knowledge repository;

receiving a user query from a user using a front-end module of the server to identify configuration data related to problems in the IT system;

analyzing the configuration data stored in the long-term data storage with an analytical module to transform the configuration data to be aligned with the user query;

responsive to the analysis applying a runtime noise detection module to identify and suppress transformed configuration data that are identified as noise to remove irrelevant transformed configuration data from a list of transformed configuration data provided in response to the user query.

In an embodiment of the disclosure, the agent determines what configuration data to collect with a pre-collection filtering module that excludes collection of configuration data from problematic sources based on rules from the data knowledge repository. Optionally, the agent determines what configuration data of the collected configuration data to transmit to the server with an agent safeguard mechanism module that filters out problematic configuration data with quality problems. In an embodiment of the disclosure, the agent safeguard mechanism module assesses the quality of the collected configuration data by triggering various mechanisms including a data completeness check, a length check, an expected configuration type, cross-field validation, a range check, allowing empty fields, a format check, a threshold check, a uniqueness check, and a CI and configuration structure check; wherein for each of the various mechanisms the user can modify parameters and/or enable disable the mechanism. Optionally, the front-end module includes a user interface that enables a user to create custom noise rules for use by the batch noise detection module.

In an embodiment of the disclosure, the server includes a learning component, which is enabled to generalize existing rules from the data knowledge repository and store them back in the data knowledge repository. Optionally, the batch noise detection module utilizes several mechanisms to identify specific types of noise in the configuration data and wherein for each of the various mechanisms the user can modify parameters and/or enable disable the mechanism. In an embodiment of the disclosure, the mechanisms include checking if a path, parameter or value of a configuration entry in the configuration data is machine generated or if files within a specific folder are frequently added and removed. Optionally, the batch noise detection module utilizes several mechanisms to identify specific types of noise at a specific configuration item and forms a rule that encompasses all the configuration data associated with the specific configuration item. In an embodiment of the disclosure, the runtime noise detection module identifies a group of configuration data that reflects deletion of an environment and deletion of sub environments of the environment; the runtime noise detection module reports the configuration data reflecting deletion of the environment and suppresses the configuration data reflecting deletion of the sub environments.

There is further provided according to an embodiment of the disclosure, a computer system for reducing noise in configuration data in an IT system, comprising:

agents in a network of the IT system for collecting configuration data from the configuration items;

a server comprising a processor and memory to process the configuration data;

wherein the agents are programmed to transmit the collected configuration data to the server for processing;

wherein the server is programmed to perform the following:

blocking receipt of selected configuration data by a server load protection module to protect the server from overload by hazardous content;

storing the configuration data at the server in a long-term data storage;

processing the configuration data with a batch noise detection module that identifies noise in the configuration data and suppresses non-desired configuration data; the batch noise detection module deduces rules based on the identified noise and stores the rules in a data knowledge repository;

receiving a user query from a user using a front-end module of the server to identify configuration data related to problems in the IT system;

analyzing the configuration data stored in the long-term data storage with an analytical module to transform the configuration data to be aligned with the user query;

responsive to the analysis applying a runtime noise detection module to identify and suppress transformed configuration data that are identified as noise to remove irrelevant transformed configuration data from a list of transformed configuration data provided in response to the user query.

In an embodiment of the disclosure, the agent determines what configuration data to collect with a pre-collection filtering module that excludes collection of configuration data from problematic sources based on rules from the data knowledge repository. Optionally, the agent determines what configuration data of the collected configuration data to transmit to the server with an agent safeguard mechanism module that filters out problematic configuration data with quality problems. In an embodiment of the disclosure, the agent safeguard mechanism module assesses the quality of the collected configuration data by triggering various mechanisms including a data completeness check, a length check, an expected configuration type, cross-field validation, a range check, allowing empty fields, a format check, a threshold check, a uniqueness check, and a CI and configuration structure check; wherein for each of the various mechanisms the user can modify parameters and/or enable disable the mechanism. Optionally, the front-end module includes a user interface that enables a user to create custom noise rules for use by the batch noise detection module and runtime noise detection module.

In an embodiment of the disclosure, the server includes a learning component, which is enabled to generalize existing rules from the data knowledge repository and store them back in the data knowledge repository. Optionally, the batch noise detection module utilizes several mechanisms to identify specific types of noise in the configuration data and wherein for each of the various mechanisms the user can modify parameters and/or enable disable the mechanism. In an embodiment of the disclosure, the mechanisms include checking if a path, parameter or value of a configuration entry in the configuration data is machine generated or if files within a specific folder are frequently added and removed. Optionally, the batch noise detection module utilizes several mechanisms to identify specific types of noise at a specific configuration item and forms a rule that encompasses all the configuration data associated with the specific configuration item.

There is further provided according to an embodiment of the disclosure, a non-transitory computer readable medium comprising an executable program configured to perform the method of claim 1.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein:

FIG. 8 is a table presenting an example of a Data Knowledge Repository, according to an embodiment of the disclosure;

FIG. 10 comprises tables of rule generalizations, according to an embodiment of the disclosure.

DETAILED DESCRIPTION

Figure 1:
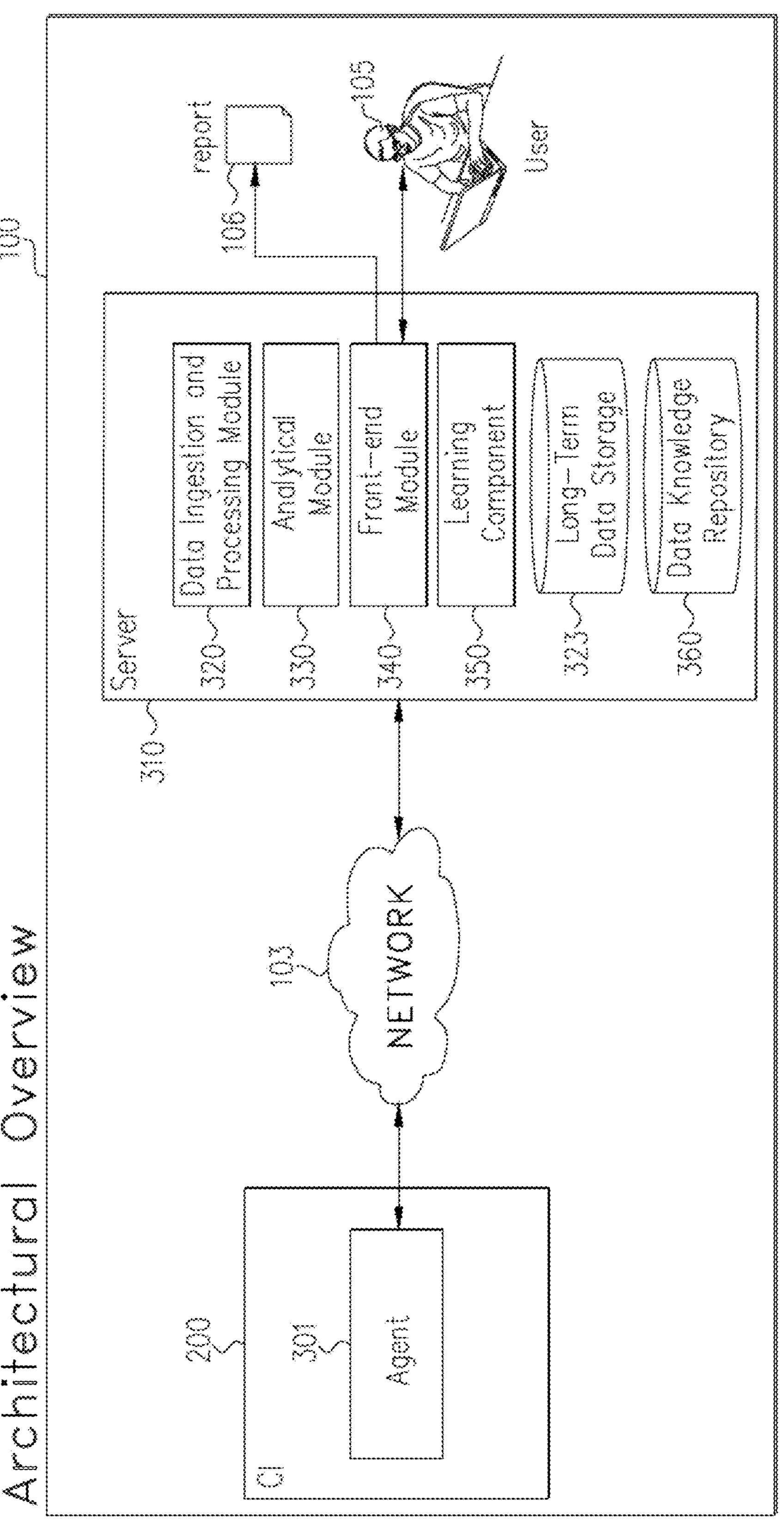
FIG. 1 is a schematic illustration of a system for implementing Noise Reduction Mechanisms on Configuration Data in IT systems, according to an embodiment of the disclosure.

FIG. 1 is a schematic illustration of a system 100 for implementing Noise Reduction Mechanisms on Configuration Data 203 in IT systems, according to an embodiment of the disclosure. The system 100 comprises configuration items (CI) 200 (e.g., a host, workstation, cloud account, network device or device with API access) on which an agent 301 is installed to collect configuration data 203 and transfer the configuration data 203 to a server 310 for processing. Optionally, the processing includes storing the configuration data 203, analyzing the configuration data 203 to identify possible sources of problems in the IT system. In an embodiment of the disclosure, agent 301 is connected via a network 103 to the server 310.

In some embodiments of the disclosure, agent 301 is installed on a different server (or on server 310) from which the agent queries configuration items 200 to collect the configuration data 203, instead of being installed on the configuration items 200.

In an embodiment of the disclosure, Server 310 comprises several modules:

1. A data Ingestion and Processing module 320;
2. An analytical module 330;
3. A front-end 340; and
4. A learning Component 350.

The server 310 may include two components for saving data:

1. A long-Term Data Storage 323; and
2. A data Knowledge Repository 360.

In an embodiment of the disclosure, front-end 340 interacts with user 105 or can generate a report 106. Optionally, the report 106 can be presented in different formats: it may be a file in various formats, such as an Excel or PDF document, included as part of the email, or saved as a view within the user interface (UI). Optionally the report 106 provides a list of configuration data 203 that were suppressed to reduce the overhead in dealing with insignificant items (noise). Alternatively, or additionally, the report 106 includes information about configuration items that were not suppressed and may be significant in solving problems in the IT system. In an embodiment of the disclosure, when problems occur in the IT system the report 106 is used to locate possible configuration items that are responsible for the problem. Optionally, by suppressing configuration data 203 that is noise the size and complexity of the report is reduced, thus making it easier for an administrator to identify problems based on the report 106.

Server 310 can be hosted on either one machine or multiple machines. In the case of multiple machines, its modules and components are distributed across different machines that communicate with each other over network 103. In FIG. 1 Server 310 is shown being hosted on a single machine.

Figure 2:
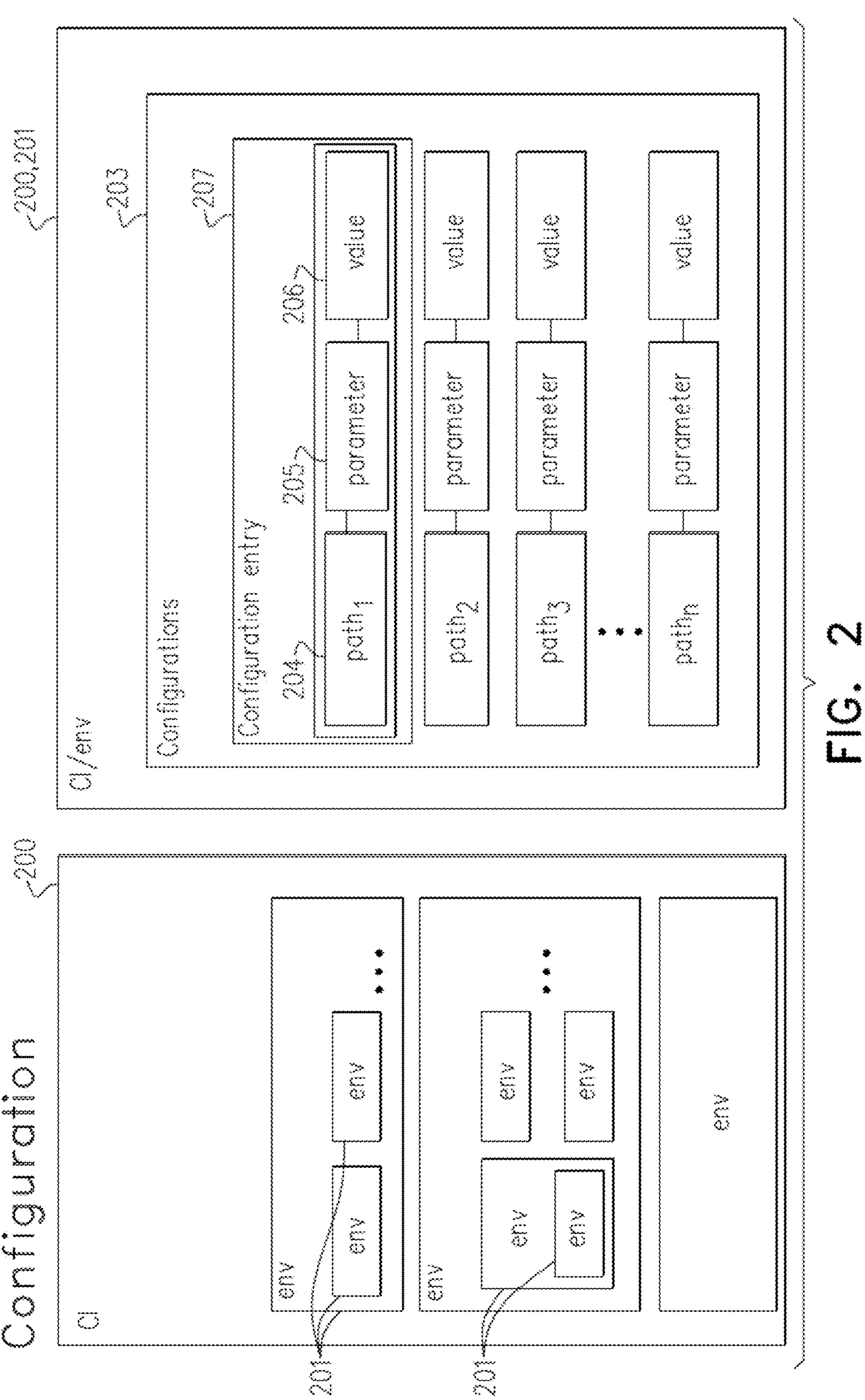
FIG. 2 is a schematic illustration of the structure of a configuration item (CI), according to an embodiment of the disclosure.

FIG. 2 is a schematic illustration of the structure of a configuration item (CI) 200, according to an embodiment of the disclosure. As described above, CI 200 can be a host, cloud account, network device, devices with API access etc. Each CI 200 can comprise multiple environments 201, representing various types or technologies such as Microsoft Windows, Unix OS, Oracle DB, and others. Furthermore, each of the environments 201 can recursively contain additional (sub) environments 201.

In an embodiment of the disclosure, configuration item 200 or environment 201 can additionally comprise configuration data 203. Configuration data 203 may comprise multiple configuration entries 207. Wherein, each configuration entry 207 comprises a path 204 to access the configuration item 200, a parameter 205 related to the configuration item 200, and a value 206 for the parameter 205. Optionally, the value 206 can be empty, which might indicate that no value 206 has been set to this parameter 205 within this path 204.

In an embodiment of the disclosure, the configuration data 203 dealt with by system 100 includes multiple configuration entries 207 of configuration items 200 and/or environments 201 at the configuration items 200.

Figure 3:
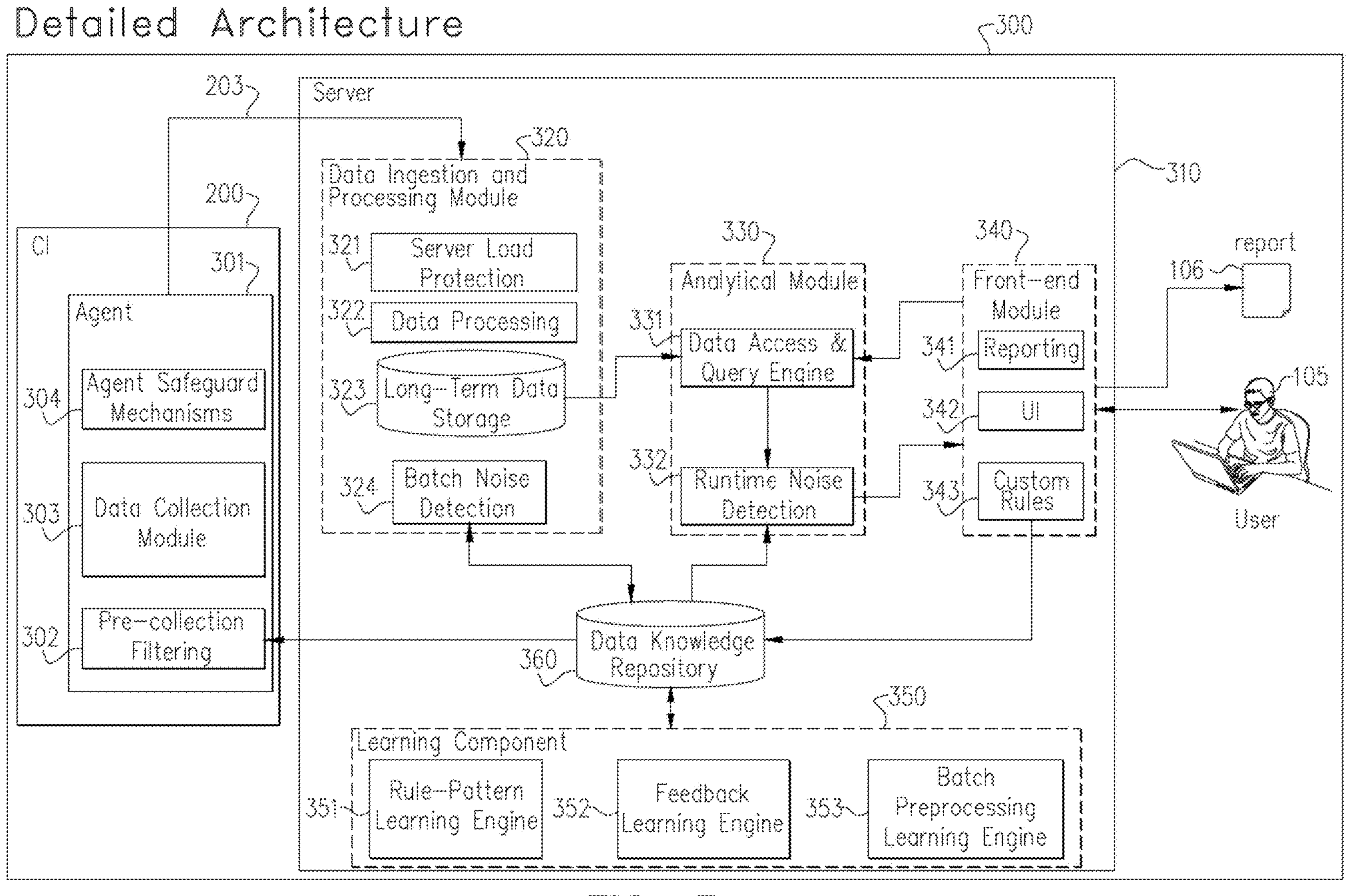
FIG. 3 is a schematic illustration of a detailed architecture for a noise reduction mechanism applied on configuration data, according to an embodiment of the disclosure.

FIG. 3 is a schematic illustration of a detailed architecture 300 for a noise reduction mechanism (system 100) applied on configuration data 203, according to an embodiment of the disclosure. In an embodiment of the disclosure, the architecture 300 includes interaction between the following components:

configuration item (CI) 200,
Server 310,
User 105, and
report 106.

In an embodiment of the disclosure, agent 301 which can be installed on configuration item 200, is responsible for retrieving configuration data 207 from the CI 200. The agent 301 comprises the following components:

Pre-collection Filtering 302;

Data Collection Module 303; and

Agent Safeguard Mechanisms 304.

Optionally, pre-collection Filtering 302 is responsible for excluding specific CIs 200, environments 201 or configuration data 203 from the collection process based on the rules defined in Data Knowledge Repository 360. The Data Collection Module 303 contains definitions for collecting data from various technologies and gathers the actual data according to these definitions. Agent Safeguard Mechanisms 304 evaluates whether the quality of the collected configuration data is sufficient or if details are missing (e.g., from a faulty device).

Server 310 is composed of several components. First, the Data Ingestion and Processing Module 320 receives configuration data 203 from Agent 301 and verifies it against multiple mechanisms in Server Load Protection 321 to prevent overloading the Server 310 with hazardous content. If the data passes these checks, it proceeds to Data Processing 322, which is responsible for storing the data in Long-Term Data Storage 323. The last component of Data Ingestion and Processing Module 320, Batch Noise Detection 324, continuously monitors configuration data 203 for noise, deduces rules based on the identified noise and stores the deduced rules in Data Knowledge Repository 360.

The next module of Server 310 is the Analytical Module 330, which includes the Data Access & Query Engine 331. Optionally, the Data Access & Query engine 331 retrieves data from Long-Term Data Storage 323 when a request is initiated from the Front-end Module 340. The retrieved data is processed and transformed to align with the request from Front-end Module 340. For instance, if a comparison between hosts is requested (e.g., host 1, host 2, and host 3), the configuration entries 207 from all hosts are organized as follows: for every pair of configuration path 204 and parameter 204 across all three hosts, entries are generated. Each entry includes the configuration path 204, parameter 205, and corresponding values for all three hosts. This transformation enables the subsequent process, Runtime Noise Detection 332, to proceed effectively.

Another example of a request is to display the changes that happened on a specific list of hosts within a predefined time period (e.g., show all the changes that happened on host 1 from yesterday until now). In this scenario, the configuration entries 207 from a specified list of hosts are processed as follows: for each pair of configuration paths 204 and their parameters 205, the corresponding configuration values 206 are analyzed. If there is a configuration value 206 that was collected within a predefined time period and whose value differs from the previous value (on the same configuration path 204 and parameter 205), it is identified as a change. As a result, the transformed data comprises entries containing configuration paths 204, parameters 205, and a list of configuration values 206 that changed within a predefined time period.

The transformed configuration data is then processed by Runtime Noise Detection 332, which applies additional mechanisms alongside the retrieved rules from Data Knowledge Repository 360 to identify and suppress noise in configuration data. Optionally, the remaining configuration data are subsequently sent to the Front-end Module 340.

Front-end Module 340 comprises Reporting 341, user interface (UI) 342, and Custom Rules 343. In an embodiment of the disclosure, reporting 341 can be utilized to generate report 106, which provides the remaining transformed configuration data for identifying the source of problems in the IT system. Optionally, the report 106 can be generated manually, or it can be scheduled to run daily, weekly, monthly, etc., and may identify significant configuration data related to predefined CIs 200 or environments 201 over specified time periods (such as last day, last week, last month, etc.). As mentioned, the report 106 can be presented in various formats: it may be a file, such as an Excel or PDF document, included as part of an e-mail, or saved as a view within the UI 342.

Additionally, user 105 can interact with the UI component 342 to display the changes for the CIs 200 or environments 201 within a specific time frame of interest or to see the differences between the selected CIs 200 or environments 201. Additionally, user 105 has the ability to create custom noise rules or additional rules for Preprocessing 640 (FIG. 6) in the step of Batch Noise Detection 324 using Custom Rules 343, which are stored in the Data Knowledge Repository 360.

Finally, Server 310 includes the Learning Component 350, which contains three engines: the Pattern Learning Engine 351, the Feedback Learning Engine 352 and the Batch Preprocessing Learning Engine 353. The Rule-Pattern Learning Engine 351 is used to generalize existing rules from the Data Knowledge Repository 360 or to create new rules, while the Feedback Learning Engine 352 adjusts the mechanisms in Batch Noise Detection 324 or Runtime Noise Detection 332 to enhance their performance. Batch Preprocessing Learning Engine 353 can generate new rules to distinguish configuration entries 207 that have identical paths 204 and parameters 205, if parameters 205 exist. Additionally, it can establish rules for normalizing or standardizing parameters 205 or paths 204 that are expected to vary across different CIs 200 or environments 201, making the comparison between them possible.

Figure 4:
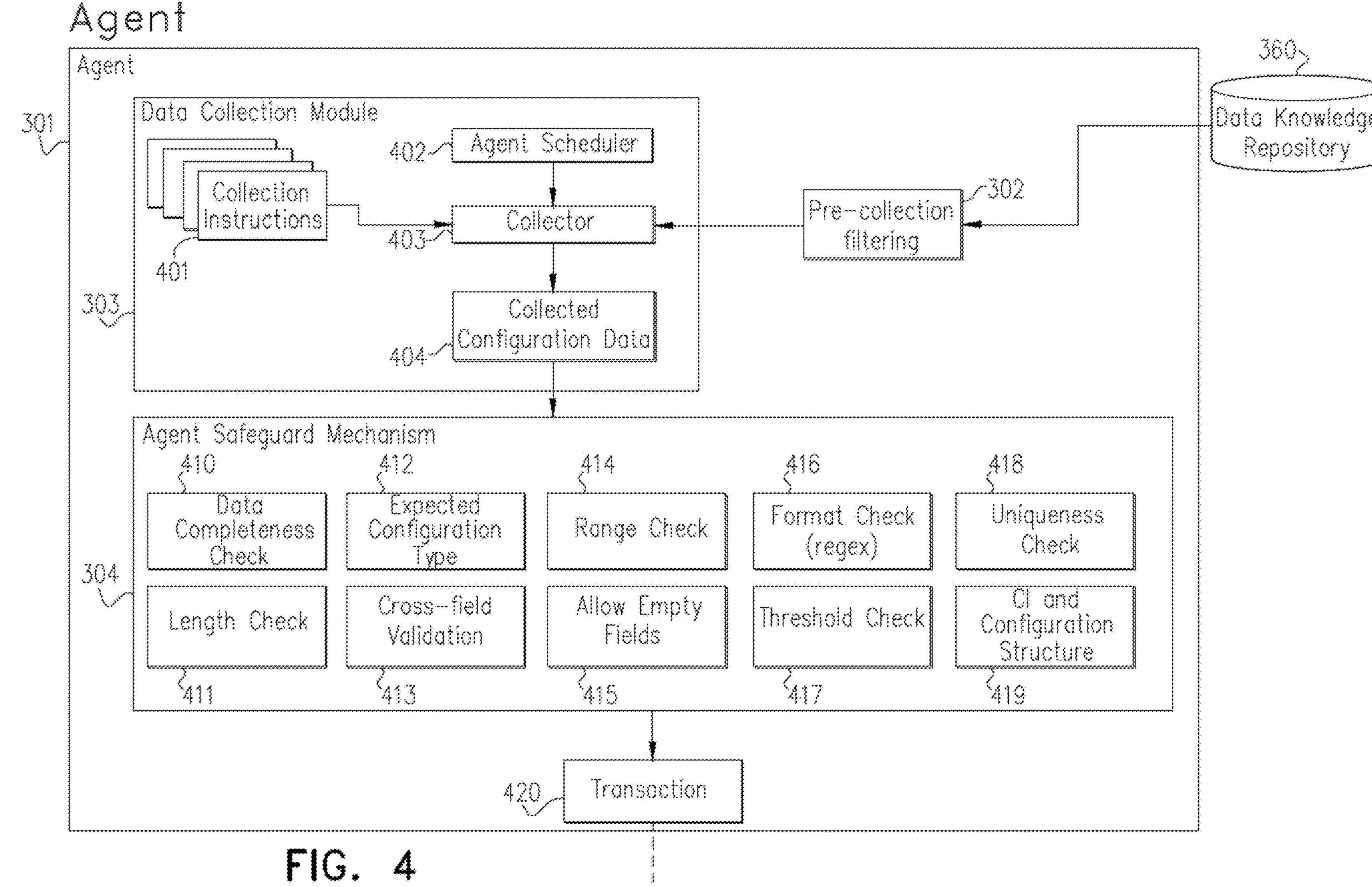
FIG. 4 is a schematic illustration of a data collection process for an agent, according to an embodiment of the disclosure.

FIG. 4 is a schematic illustration of a data collection process for an agent 301, according to an embodiment of the disclosure. The process comprises using the Data Collection Module 303, Agent Safeguard Mechanism 304 and Pre-collection Filtering 302. The collection begins when the Agent Scheduler 402, which is part of the Data Collection Module 303, initiates a process. This collection can be scheduled to occur at regular intervals (e.g., every 60 minutes, 120 minutes, daily, etc.) or can be manually triggered.

In an embodiment of the disclosure, Agent Scheduler 402 triggers the Collector 403 to start the collection of the configuration data 203. The Collector 403 receives Collection Instructions 401 and Pre-collection filtering 302 from the Data Knowledge Repository 360. Collection Instructions 401 include rules for various technologies (such as Microsoft Windows 2019, Oracle Database, AWS Account) detailing how to collect their configurations data 203.

In an embodiment of the disclosure, Pre-collection Filtering 302 receives rules from the Data Knowledge Repository 360, specifying configuration items 200, environments 201, or configuration entries 207 that should be excluded from collection. The collected data is sent to the Collected Configuration Data 404, which serves as an input for the Agent Safeguard Mechanism 304. This mechanism assesses the quality of the collected data by triggering various mechanisms, such as Data Completeness Check 410, Length Check 411, Expected Configuration Type 412, Cross-field Validation 413, Range Check 414, Allow Empty Fields 415, Format Check 416, Threshold Check 417, Uniqueness Check 418, and CI and Configuration Structure 419. Each of these mechanisms can be enabled or disabled by User 105, who may have the ability to modify their parameters when applicable. The parameters for these mechanisms can be included in the Collection Instructions 401 or defined separately for different paths 204 or parameters 205 based on the type or technology of the collected environment 201 or CI 200. Moreover, the parameters can only be specified for a subset of paths 204, parameters 205, or values 206.

In an embodiment of the disclosure, Data Completeness Check 410 verifies that the collected data includes all mandatory fields. For instance, when collecting data from Microsoft Windows, at least one processor's data must be collected. If this data is missing, it may indicate an issue with the data collection process. In this case, the entire environment's 201 data is considered invalid and should not be sent to Server 310.

In an embodiment of the disclosure, Length Check 411 verifies that an individual parameter 205 or value 206 meets specific length requirements. Length Check 411 checks if the length is fixed, contains at least a minimum number of characters or digits, or does not exceed a maximum number of characters or digits. For example, if a parameter represents a timestamp in seconds, its value length should be exactly 10 digits. If the parameter 205 or value 206 violates the Length Check 411, such data is considered invalid and should not be sent to Server 310.

In an embodiment of the disclosure, Expected Configuration Type 412 verifies whether the value 206 is of the appropriate data type, such as an integer (which may include negative or positive values), string, datetime, or list of values. For example, if a parameter 205 represents the maximum clock speed of a processor, its corresponding value 206 should be a non-negative integer. If the value 206 violates the Expected Configuration Type 412, the value 206 is considered invalid and it should not be sent to Server 310.

In an embodiment of the disclosure, Cross-field Validation 413 verifies predefined relationships between the values 206 of different parameters 205. For example, when collecting certificate data, the start and end time of the certificate should follow this rule: the start time must be earlier than the end time. Another example is if a parameter specifies the network protocol type (e.g., IPv4 or IPv6), the corresponding IP address must match the correct format for that protocol. If Cross-field Validation 413 fails, both values 206 are deemed invalid and the data is not sent to Server 310.

In an embodiment of the disclosure, Range Check 414 verifies whether the value 206 falls within a defined interval, specified by a minimum and maximum value. For certain values 206 this might not be applicable and in such cases, a Threshold Check 417 might be a more appropriate option. Similarly, if the Range Check 414 fails, value 206 is considered invalid and it is not sent to Server 310.

In an embodiment of the disclosure, Allow Empty Values 415 checks whether the value 206 is allowed to be empty, if empty values are not allowed and the value is missing, the data is not sent to Server 310.

In an embodiment of the disclosure, Format Check 416 verifies whether the value 206 matches a predefined pattern. For instance, it checks whether the value 206 of the parameter 205 "SIZE" is structured as a number followed by a size unit (kB, MB, GB, etc.). Another example is if the parameter 205 is a date object with the format YYYYMMDD, the value 206 "2024 Oct. 23" would be considered invalid, whereas "20241023" is valid. Invalid values 206 are not sent to Server 310.

In an embodiment of the disclosure, Threshold Check 417 assesses whether the value 206 is either above or below the predefined boundary. The specific relationship—whether the value 206 should be less than or greater than the boundary—is also established in advance. For example, the value 206 for the parameter 205 "current clock speed" should be non-negative. If the value 206 is negative, it fails Threshold Check 417 and is not sent to Server 310.

In an embodiment of the disclosure, Uniqueness Check 418 verifies whether the values 206 designated as unique (such as IDs) are not duplicated. For example, the parameter 205 "ID" for the cloud resources must be unique for each resource and cannot be shared among multiple resources. If a duplicate ID is detected, the Uniqueness Check 418 fails, and value 206 is not sent to Server 310.

In an embodiment of the disclosure, CI and Configuration Structure 419 can enforce limits on the following structural elements: the number of environments 201 a CI 200 can contain, the number of child environments 201 within a (specific) environment 201, and the file count within a configuration entry 206 (such as folder). If any of these thresholds are exceeded, CI and Configuration Structure 419 will fail, and all data associated with that CI 200, environment 201, or folder will not be sent to Server 301. This prevents data overflow by ensuring compliance with predefined structural limits before data is sent.

In an embodiment of the disclosure, once the Collected Configuration Data 404 has been filtered out by the Agent Safeguard Mechanisms 304, the transaction 420 is created containing the filtered subset of Collected Configuration Data 404 along with the transaction metadata and is sent to Server 310 Data Ingestion and Processing module 320. This transaction 420 can contain configuration data of one or multiple CIs 200 or one or multiple environments 201, depending on the implementation.

In an embodiment of the disclosure, during the initial scan of the CI 200, the agent collects all the configurations data 203 that are defined in Collection Instructions 401, and this data is sent to Server 310. In subsequent scans, the Collector 403 checks for any differences compared to the previous scan. If differences are found, the updated data is added to the Collected configuration data 404 and undergoes various checks within the Agent Safeguard Mechanism 304 before being sent to Server 310 in a transaction 420. Otherwise, if no differences are detected, the data is not sent.

Figure 5:
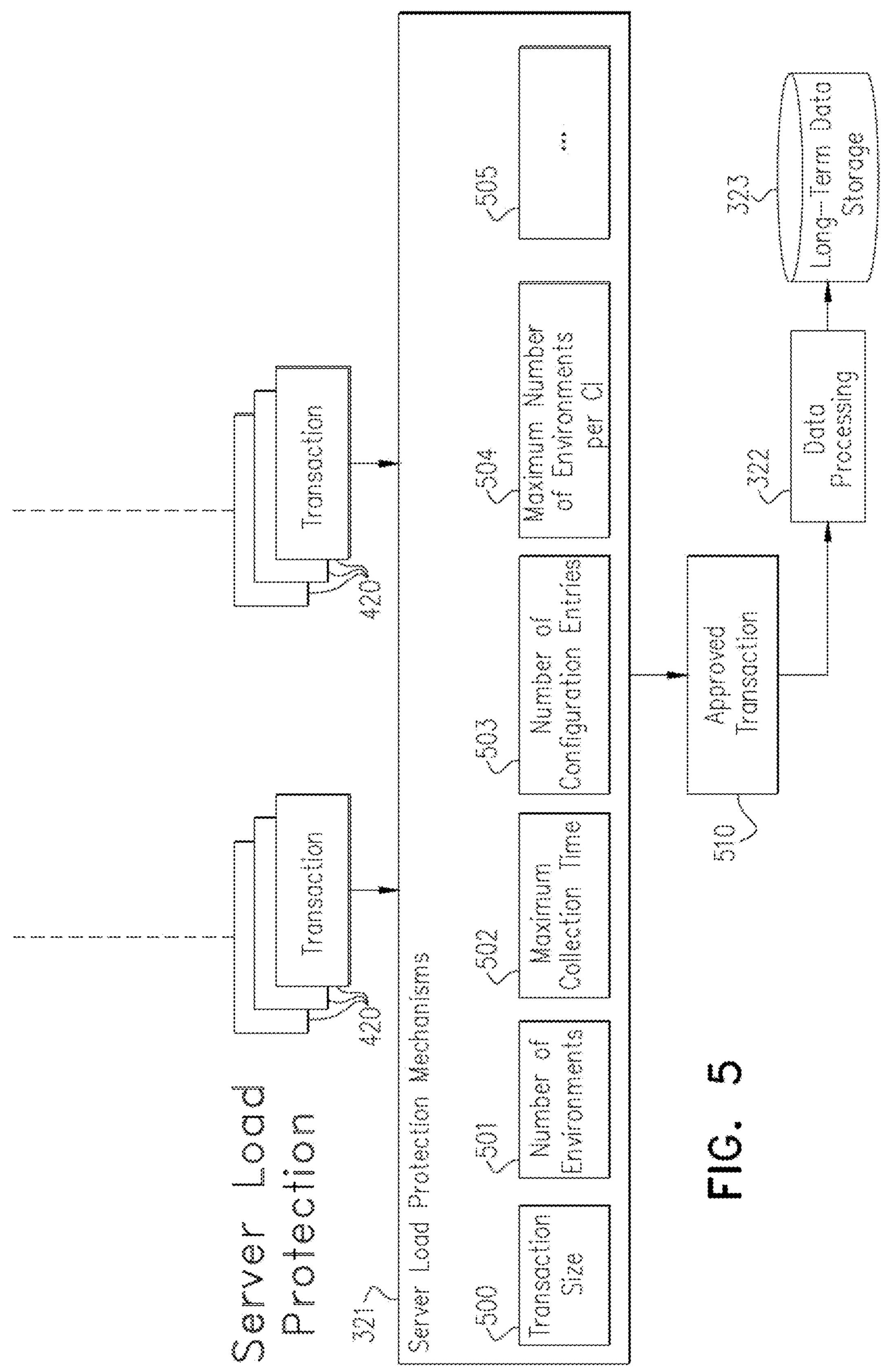
FIG. 5 is a schematic illustration of a server load protection module, tasked with limiting the load on a Server to prevent overloading, according to an embodiment of the disclosure.

FIG. 5 is a schematic illustration of Server Load Protection 321, tasked with limiting the load on the Server 310 to prevent overloading, according to an embodiment of the disclosure. Optionally, the input to the Server Load Protection Mechanisms 321 consists of transactions 420 which are sent by one or more Agents 301. These transactions 420 are evaluated against various mechanisms within Server Load Protection Mechanisms 321, including but not limited to Transaction Size 500, Number of Environments 501, Maximum Collection Time 502, Number of Configuration Entries 503, Maximum Number of Environments per CI 504, and other mechanisms 505. Each of these mechanisms can be enabled or disabled by User 105, who may have the ability to modify their parameters when applicable.

In an embodiment of the disclosure, Transaction Size 500 restricts the size of a transaction 420 to a predefined value (such as 50 MB); if the transaction size exceeds this limit, the transaction 420 is not approved.

In an embodiment of the disclosure, Number of Environments 501 limits the number of environments 201 to a specified value; if the number of environments 210 included in a transaction 420 exceeds this limit, the transaction 420 is not approved.

In an embodiment of the disclosure, Maximum Collection Time 502 sets a time limit to the transaction 420, meaning that if the transaction scan exceeds the designated time limit, the transaction 420 is not approved.

In an embodiment of the disclosure, Number of Configuration Entries 503 restricts the number of configuration entries 207 to a predefined value; if the number of configuration entries in a transaction 420 exceeds this limit, that transaction 420 is not approved.

In an embodiment of the disclosure, Maximum Number of Environments per CI 504 sets a limit on the number of environments 201 that CI 200 can have. If this number is exceeded, the corresponding transaction 420 is not approved. Additionally, further mechanisms 505 can be implemented as needed.

Optionally, once the transaction 420 has been evaluated against all enabled Server Load Protection Mechanisms 321 and is approved from each one, it is marked as an Approved transaction 510. Subsequently, it is forwarded to Data processing 322, which saves the transaction and its associated data to the Long-Term Data Storage 323.

Figure 6:
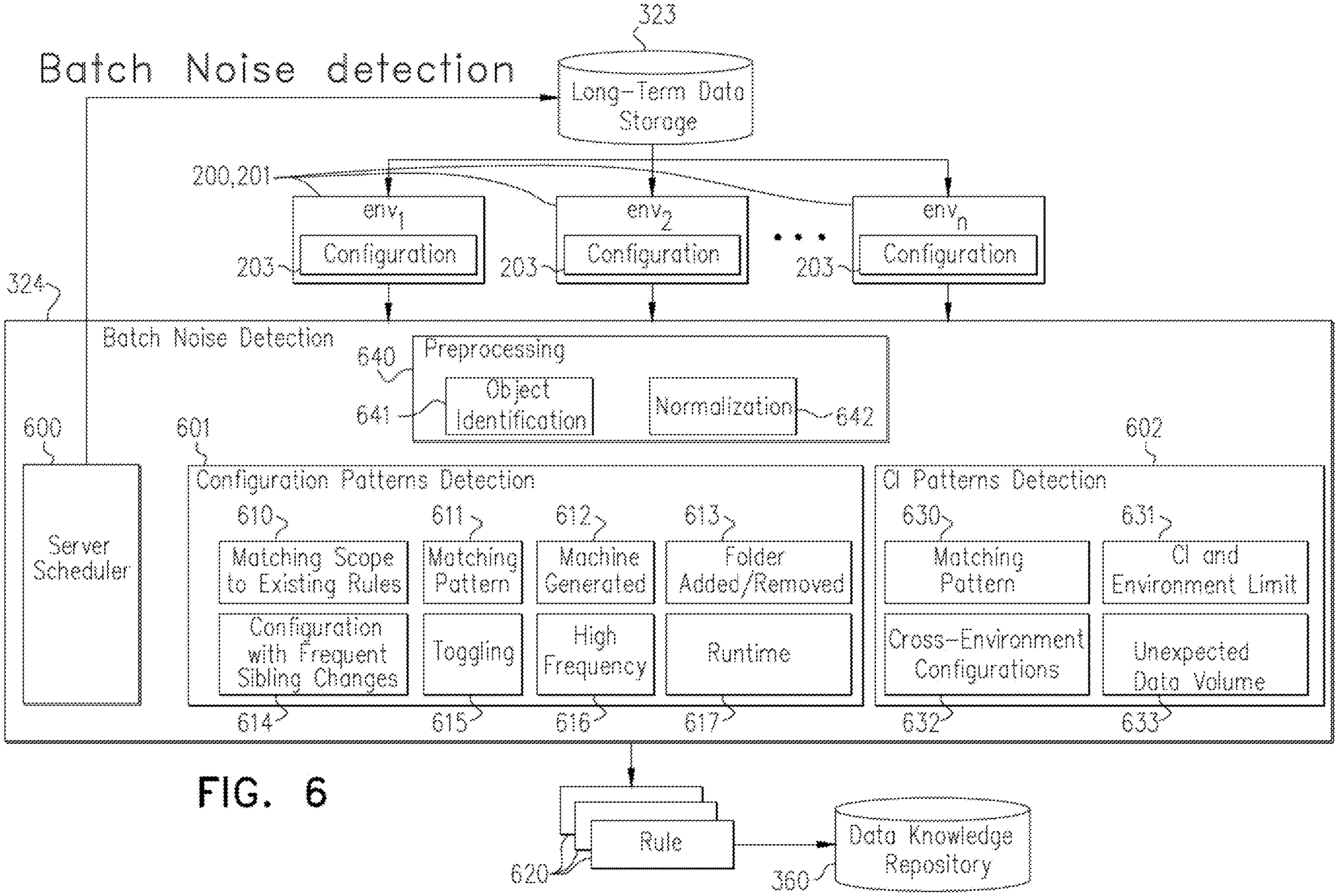
FIG. 6 is a schematic illustration of a detailed description of Batch Noise Detection, according to an embodiment of the disclosure.

FIG. 6 is a schematic illustration of a detailed description of Batch Noise Detection 324, according to an embodiment of the disclosure. In an embodiment of the disclosure, Batch Noise Detection 324 includes four main components: Server Scheduler 600, Preprocessing 640, Configuration Patterns Detection 601, and CI Patterns Detection 602.

In an embodiment of the disclosure, Server Scheduler 600 is responsible for triggering Configuration Pattern Detection 601 and CI Pattern Detection 602 either on a predefined schedule or manually. The Server Scheduler 600 begins by retrieving data from Long-Term Data Storage 323, obtaining configuration data 203 from various CIs 200 or environments 201 whose values 206 had changed within a specified time filter. This data serves as an input to Preprocessing 640.

In an embodiment of the disclosure, Preprocessing 640 is tasked with preparing configuration data 203 to enhance the performance of subsequent processes, namely Configuration Patterns Detection 601 and CI Patterns Detection 602. It consists of two components, Object Identification 641 and Normalization 642. Object identification ensures that each entry 207 can be uniquely identified and normalization ensures that identical elements on different configuration items 200 can be compared and not identified as different types of elements due to insignificant difference (e.g., if on one host the operating system is installed in the directory c:\windows and on another host it is installed in d:\windows, the two will be recognized as items of similar function).

In an embodiment of the disclosure, Object Identification 641 ensures consistency in identifying configuration data 203 by resolving cases where certain configuration entries 207 share identical paths 204 (and if parameter 205 is present, same parameter 205), necessitating a unique identification mechanism. For instance, consider an XML file containing multiple "entry" elements. Each "entry" element has the same path 204. When a new "entry" element is added, Object Identification 641 helps distinguish between existing and new entries to avoid reporting that all "entry" elements are being removed and then added. This is achieved by assigning each "entry" element a unique key or ID, derived from specific sub-elements within each "entry" element. Object Identification 641 thus enables accurate comparison of configuration entries 207 and reduces noise. Once unified, the data becomes suitable for various noise detection mechanisms.

Normalization 642 further ensures consistency by standardizing paths 204 or parameters 205 expected to differ across multiple CIs 200 or environments 201. For example, application deployments can create unique folder names containing identifiers (e.g., "application_478fs873"). Normalizing the folder name to a template like "application_{id}" allows for consistent comparison across CIs 200 or environments 201, which helps in identifying noise patterns across CIs 200 or environments 201.

Optionally, for both preprocessing 640 mechanisms, users have the option to manually apply Object Identification 641 or Normalization 642, which is especially important in discovering CI Patterns Detection 602.

In an embodiment of the disclosure, Configuration Patterns Detection 601 utilizes several mechanisms to identify in the configurations 203. These mechanisms include but are not limited to: Matching Scope to Existing Rules 610, Matching Pattern 611, Machine Generated 612, Folder Added/Removed 613, Configuration with Frequent Sibling Changes 614, Toggling 615, High Frequency 616, and Runtime 617. Each of these noise detection mechanisms can be enabled or disabled by User 105, who may also have the ability to modify their parameters when applicable. When a mechanism identifies noise in a configuration entry 207, it creates a new rule 620 with the following details (see FIG. 8):

Scope 801: Defines the context of the rule, including the CI 200, Environment 201, Path 204 and Parameter 205.

Noise Category 802: A short name representing the specific noise detection mechanism.

Created by 803: Automatically populated with "Batch Noise Detection" to indicate the origin of the rule.

Status 804: Set to "Pending Review", indicating the rule needs User 105 verification.

Last Modified 805: Automatically updated with "Batch Noise Detection" and the timestamp of rule creation.

The Configuration entry 207 can be evaluated for noise using each mechanism in the Configuration Patterns Detection 601, or the process can stop as soon as one of the mechanisms detects noise, which improves performance.

In an embodiment of the disclosure, Matching Scope to Existing Rules 610 checks whether the configuration's scope is covered by any of the existing rules 620 in Data Knowledge Repository 360. For instance, consider the following configuration scope A:

CI: host1
Environment: Microsoft Windows 2019
Path: OS/OSSWConfig/Drivers/BthEnum
Parameter: ACCEPTSTOP This scope A can be matched with the following scope B found in the Data Knowledge Repository 360:

CI: *
Environment: Microsoft Windows 2019
Path: */Drivers/*
Parameter: ACCEPTSTOP Note that * wildcard in scope allows for any value, meaning that scope B covers parameter 205 ACCEPTSTOP under the path 204 that contains folder Drivers for Microsoft Windows 2019, regardless of the specific CI 200. Since scope B matches scope A, the configuration entry 207 is marked as noise, and the noise category 802 assigned to this configuration entry 207 is inherited from scope B.

In an embodiment of the disclosure, Matching Pattern 611 checks whether the configuration entry's path 204, parameter 205 or value 206 matches predefined patterns that are considered noisy. For instance, folders like logs or help as well as those ending with -bak or -old, are categorized as noisy. Similarly, files with extensions .log or .pid are flagged as noise. When a configuration entry 207 matches one of these noisy patterns, Rule 620 is created, and the noise category 802 can be set to MATCHING_PATTERN.

In an embodiment of the disclosure, Machine Generated 612 checks whether the path 204, parameter 205, or value 206 of a configuration entry 207 is machine generated. Examples include files with timestamps like gc-2024-07-15-04-53-54.log, or files with hash values, such as /main.c367ed95.js. These types of entries are identified as noise, Rule 620 is created, and the noise category 802 can be set to MACHINE_GENERATED.

In an embodiment of the disclosure, Folder Added/Removed 613 checks whether files within a specific folder are frequently added and removed, which could indicate that the folder is used for caching. When such activity is detected, the folder is marked as noisy by creating a Rule 620 with a scope describing the folder. The noise category 802 can be set to FOLDER_ADDED_REMOVED.

In an embodiment of the disclosure, Configuration with Frequent Sibling Changes 614 checks whether the same parameter 205 is frequently changing across multiple sibling entries. For example, consider a configuration entry 207 related to Users. Under this configuration entry, each user has a configuration entry 207 with a parameter describing the password. Due to the security policies, users have to regularly update their passwords. If many users are frequently updating their passwords, this activity is flagged as noisy. A new Rule 620 is created, and the noise category 802 can be set to SIBLING_CHANGES.

In an embodiment of the disclosure, Toggling 615 checks whether the value 206 of specific configuration entry 207 is frequently switching between two values (e.g., true or false, 1 or 0, . . . ). When this pattern is detected, a new Rule 620 is created, and the noise category 802 can be set to TOGGLING.

In an embodiment of the disclosure, High Frequency 616 checks whether the value 206 of specific configuration entry 207 changes constantly, but with more than two distinct values. When this pattern is detected, a new Rule 620 is created, and the noise category 802 can be set to HIGH_FREQUENCY.

In an embodiment of the disclosure, Runtime 617 checks if the value 206 is a result of a program's runtime activities. For example, this can include the generation of .pid or .lock files, or the creation of files or folders with names like periodicRestart. When such runtime behavior is detected, a new Rule 620 is created, and the noise category 802 can be set to RUNTIME.

Optionally, when a mechanism identifies noise, it generates a Rule 620 that specifies the mechanism's noise category 802, setting the status 804 to Pending Review. This rule is then saved to the Data Knowledge Repository 360.

Optionally, when a Rule 620 is created, it can be compared against the existing rules in the Data Knowledge Repository 360. If a Rule 620 matches any existing rules in the Data Knowledge Repository 360 or if there exists at least one existing rule in the Data Knowledge Repository 360 that is a more general version of a Rule 620, such a Rule 620 is considered a duplicate and should not be saved to the Data Knowledge Repository 360.

In an embodiment of the disclosure, CI Patterns Detection 602 evaluates the configuration data 203 of specific CIs 200 or environments 201 to determine if they are noisy. If a CI 200 or environment 201 is deemed noisy, it generates a new Rule 620 that sets the Scope 801 to encompass all data associated with that CI 200 or Environment 201. The noise category 802 can be assigned as STOP_COLLECTING, and the Rule 620 is saved in the Data Knowledge Repository 360. These rules 620 are utilized by the Agent 301 in Pre-collection filtering 302 to skip data collection for the identified noisy CIs 200 or environments 201. To accurately compare identical configuration data 203 across similar types of environments 201, it is essential that Object Identification 641 and Normalization 642 are properly applied.

In an embodiment of the disclosure, the mechanisms can be applied to determine if configuration data 203, specific CIs 200 or environments 201 exhibit noisy behavior: Matching Pattern 630, CI and Environment Limit 631, Cross-Environment Configurations 632, and Unexpected Data Volume 633.

In an embodiment of the disclosure, Matching Pattern 630 flags configuration data 203 or environments 201 as noisy if they match a predefined pattern. For instance, a folder named Logs would match the pattern logs and be labeled as noisy.

In an embodiment of the disclosure, CI and Environment Limit 631 monitors the number of environments 201 within a CI 200 or the number of sub-environments 201 within a (specific) environment 201. If these counts exceed a set threshold, the CI 200 or environment 201 is considered noisy. Limits can be set globally or for specific environment types, like Microsoft Windows or Oracle Database.

In an embodiment of the disclosure, Cross-Environment Configurations 632 identifies configuration data 203 that frequently change across multiple environments 201 or CIs 200. If a sufficient number of such configurations are found, they are classified as noisy. For instance, if printer configuration data within a Microsoft Windows environment is changing across multiple CIs 200, this configuration can be flagged as noise.

In an embodiment of the disclosure, Unexpected Data Volume 633 checks if the size of a configuration entry 207, including nested entries (e.g., files within a folder), exceeds a predefined threshold. Exceeding this limit marks the configuration entry 207 as noisy.

Figure 7:
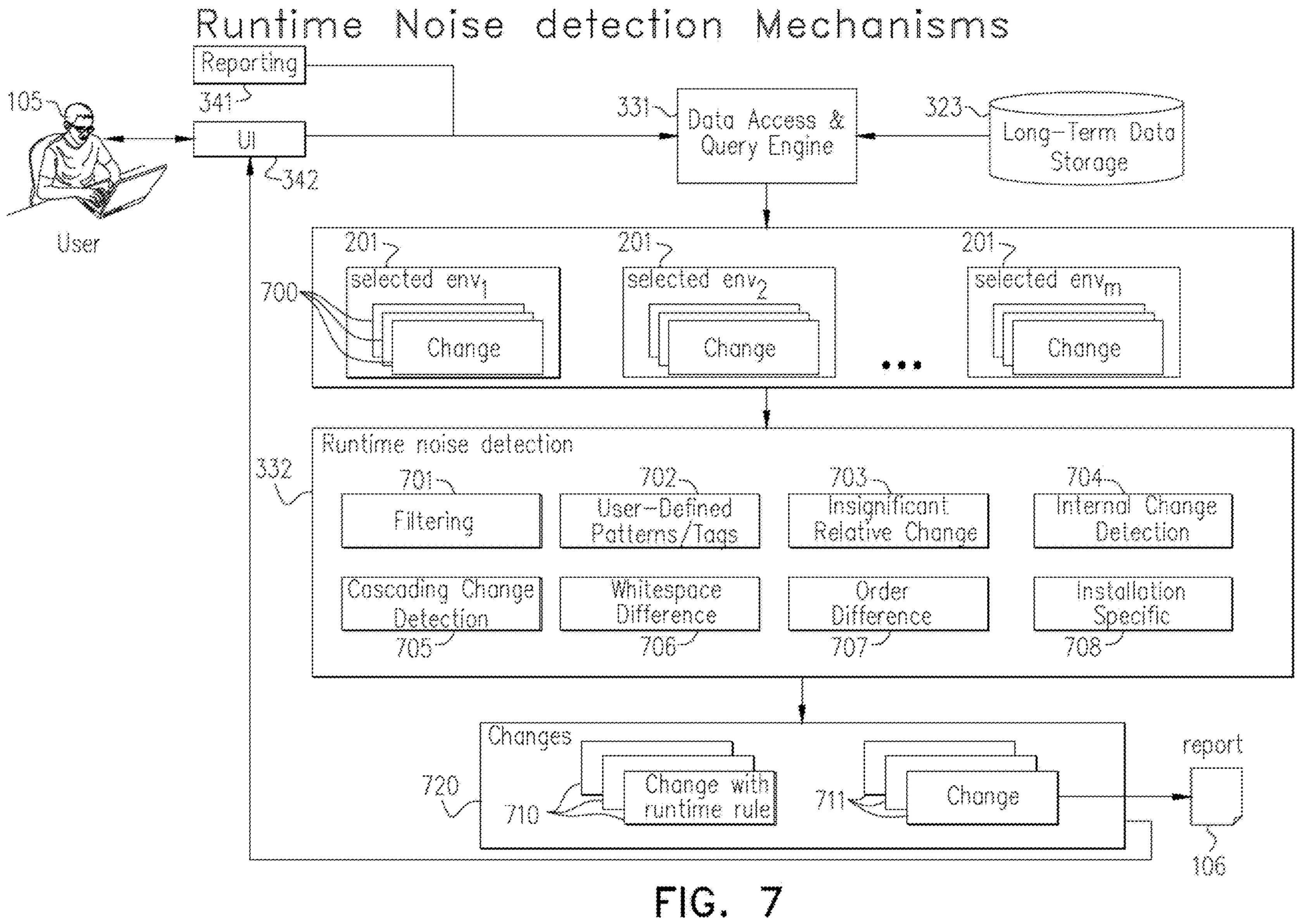
FIG. 7 is a schematic illustration of a detailed description of Runtime Noise Detection mechanisms, according to an embodiment of the disclosure.

FIG. 7 is a schematic illustration of a detailed description of Runtime Noise Detection 332 mechanisms, according to an embodiment of the disclosure. Optionally, user 105 can initiate a request through the UI 342 or Reporting 341 tool initiates a request to retrieve transformed configuration data, such as changes 700 or differences based on preselected filters, such as selecting CIs 200, environments 201, time frames, and report types. This request is processed by the Data Access & Query Engine 331, which retrieves the relevant configuration data 203 from Long-Term Data Storage 323 according to the specified filters. This results in transformed configuration data, such as a set of changes 700 or differences retrieved from various CIs 200 or environments 201.

An example of transformed configuration data can be represented by changes 700. When a configuration value 206 associated with a specific configuration path 204 and configuration parameter 205 has changed within a predefined time frame, it is considered a change 700.

Another example of transformed configuration data are differences. For example, a user 105 may request a comparison of configuration values 206 across various hosts or environments. The Data Access & Query Engine 331 first retrieves relevant configuration data 203 according to the request from Long-Term Data storage 323 and processes it to generate objects representing differences in configuration values 206 for a same configuration path 204 and configuration parameter 205 of selected hosts or environments.

In an embodiment of the disclosure, before returning the data to User 105 or to the Report 106, the changes 700 undergo filtering for noise through Runtime Noise Detection 332. This component may include several mechanisms for detecting noise, such as Filtering 701, User-Defined Patterns/Tags 702, Insignificant Relative Change 703, Internal Change Detection 704, Cascading Change Detection 705, Whitespace Difference 706, Order Difference 707, Installation Specific 708. Each of these mechanisms can be enabled or disabled by User 105, who may also have the ability to modify their parameters when applicable. If any of the mechanisms identify noise, each change is marked with a runtime rule 710.

In an embodiment of the disclosure, Filtering 701 first checks whether the scope of the change 700 falls within any of the existing scopes 801 that describes noise with an active status 804. If a match is found, the mechanism adds a runtime rule to the change 710 with the corresponding noise category from the matched scope. Additionally, further filtering can be applied to refine the changes. For instance, if there's associated data such as a change request, this mechanism can filter out changes that correspond to this request. These changes would be marked with a runtime rule 710 and can be assigned a noise category of AUTHORIZED_CHANGES.

In an embodiment of the disclosure, User-Defined Patterns/Tags 702 allows User 105 to define custom noise categories based on file or folder name patterns. For example, the TEMP category might include files that match patterns like *.tmp or *-SNAPSHOT.jar, and folders with patterns such as *Temporary* or *-SNAPSHOT. Similarly, a DEBUG category could encompass files *.pdb or folders with patterns release, debug or test. When a change 700 is detected that involves a file or folder matching one of these predefined patterns, the system adds a runtime rule with the corresponding noise category to the change 700, resulting in a change with runtime rule 710.

In an embodiment of the disclosure, Insignificant Relative Change 703 refers to changes where the difference between the previous and current value 206 is minimal. For example, if the current value of a parameter 205 like free disk space is 900 MB and the previous value was 880 MB, this minor difference is considered a noisy change. Such changes are marked with a runtime rule 710, where the noise category can be set to INSIGNIFICANT_RELATIVE_CHANGE.

In an embodiment of the disclosure, Internal Change Detection 704 identifies changes caused by internal processes, such as the server or agent upgrade. For example, during the development of Collection Instructions 401, a parameter may be renamed, leading to two changes: first is removal of the old parameter and the second one is the addition of new one. These types of changes are marked with a runtime rule 710, where the noise category can be set to INTERNAL.

In an embodiment of the disclosure, Cascading Change Detection 705 identifies duplicate changes that are the result of a single change. For example, when monitoring a file that has many parameters, such as version, size, and checksum, if the file changes, all these parameters may change as well. Instead of reporting each parameter change separately, only one change is reported, and others are marked as noise. Another scenario involves the deletion of an environment 201 containing many sub-environments. Instead of reporting individual deletions of every sub-environment, only the deletion of the main environment is reported. When such cascading changes are detected, they are marked with a runtime rule 710, where the noise category can be set to CASCADING_CHANGE.

In an embodiment of the disclosure, Whitespace Difference 706 checks for changes where the difference between current and previous value 206 lies in leading or trailing whitespace. For example, if the current value is "5" and the previous value is "5", this change is marked as a noisy change with a runtime rule 710, where the noise category can be WHITESPACE.

In an embodiment of the disclosure, Order Difference 707 identifies changes where the order of list elements is irrelevant. For instance, if the current value of a list of IP addresses is [192.168.0.0, 192.168.0.1] and the previous value was [192.168.0.1, 192.168.0.0], these values are essentially the same. Such changes are marked as noise with a runtime rule 710, where the noise category can be ORDER_DIFFERENCE.

In an embodiment of the disclosure, Installation Specific 708 is used when the values 206 of parameters 205 that are compared between multiple CIs are expected to be different, such as hostnames or available memory. Such changes are marked as noise with a runtime rule 710, where noise category can be INSTALLATION_SPECIFIC.

In summary, the output of Runtime Noise Detection 332 consists of changes identified as noisy and marked with runtime rules 710, as well as changes that are not considered noisy 711. All these changes 720 can be returned via the UI 342 to User 105, where noisy changes 710 can be filtered out by the UI 342. Another option would be that only the changes without runtime rules are returned. When the request is initiated by Reporting 341, only non-noisy changes 710 are returned to the report 106. Unlike Batch Noise Detection 324, which stores rules in the Data Knowledge Repository 360, runtime noise detection rules are executed on-the-fly when retrieving data and are not permanently stored.

FIG. 8 is a table 800 presenting an example of Data Knowledge Repository 360, according to an embodiment of the disclosure. Table 800 includes several columns: Scope 801, Noise Category 802, Created by 803, Status 804, and Last Modified 805.

In an embodiment of the disclosure, Scope 801 defines the selection criteria for CIs 200, environments 201, paths 204 or parameters 205. It allows for exact matches or wildcard matches using the * symbol, which can be substituted with any value. For example, in row 806 of table 800, every ACCEPTSTOP parameter located on Host 1 within the Microsoft Windows 2019 environment, under any path containing the Drivers folder, is classified as noise. In row 807 the entire IIS environment of CI 200 Host 1 is marked as noisy, suggesting that the Agent 301 may refrain from collecting data in this environment, depending on the Noise Category 802 and Status 804. In row 808 the Scope 801 indicates that all parameters of any Microsoft Windows 2019 environment under path OS/Installed Component/are flagged as noise.

In an embodiment of the disclosure, Noise category 802 presents the type of identified noise. Each mechanism within Batch Noise Detection 324 or Runtime Noise Detection 332, as well as users (User 105), can assign descriptive noise categories to a configuration entry 207 scope. For instance, in row 806, the parameter ACCEPTSTOP alternates between two values, resulting in the noise category 802 of TOGGLING. Other potential noise categories include: MACHINE_GENERATED for configurations identified as noise by the Machine Generated mechanism 612, IGNORE for user-defined tags that do not specify category 802, HIGH_FREQUENCY, MATCHING_PATTERN, WHITESPACE, INTERNAL, and others. A special noise category 802, STOP_COLLECTING, which is an indication for the agent 301 to skip data collection for the defined scope. For example, in row 807 the entire IIS environment on Host 1 is marked to be excluded from collection. Similarly, in row 808, any configuration data under the path OS/Installed Components/within the Microsoft Windows 2019 environment is also omitted from collection.

In an embodiment of the disclosure, the Created by 803 column identifies the originator of the entry. This could be a user, such as Michael or John as seen in rows 809 and 810, or it may indicate Batch Noise Detection as in rows 806, 807, 808.

In an embodiment of the disclosure, the subsequent column, Status 804, reflects the current state of the rule. It can be categorized as: Active: signifying that the rule is currently in use; Inactive: indicating that the rule is not being utilized, and Pending Review. Pending Review denotes that a user, such as administrator, must evaluate the rule for approval or rejection. Optionally, Pending Review can have two states: Active while Pending Review or Inactive while Pending Review. If Active while Pending Review is set, this indicates that the rule is active, but it still needs the user to approve or reject it.

In an embodiment of the disclosure, the final column, Last Modified 805, provides log information regarding the last modification, detailing the user responsible for the last update and the corresponding timestamp.

Figure 9:
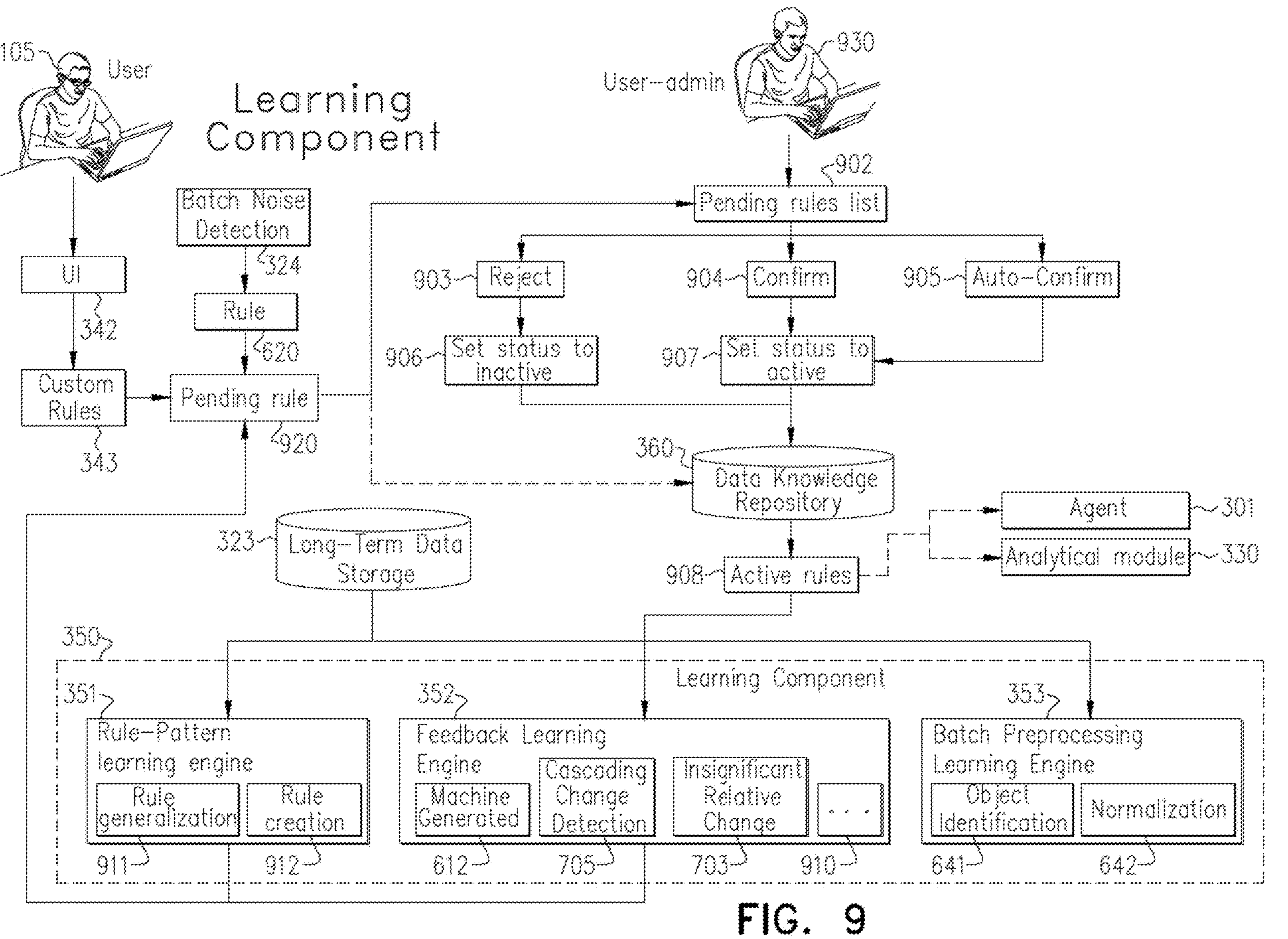
FIG. 9 is a schematic illustration of flow of a Learning Component, according to an embodiment of the disclosure.

FIG. 9 is a schematic illustration of the flow of Learning Component 350, according to an embodiment of the disclosure. Optionally, the Learning Component 350 can be initiated when a new rule, requesting a review, is generated. In an embodiment of the disclosure, the process works as follows. First, User 105 can manually create a new Custom Rule 343 via UI 342. In this way, user 105 can specify a new rule for describing noise, or new rules for Object Identification 641 or Normalization 642. Alternatively, the Batch Noise Detection 324 mechanism automatically creates different rules 620. Next, these newly created rules have the status of Pending review, and are referred to as Pending rule 920. These rules are then stored in the Data Knowledge Repository 360 and sent to the Pending Rules List 902, which contains all rules awaiting review and approval. While rules are awaiting review and approval, they can be active 907 (Active while Pending Review) or inactive 906 (Inactive while Pending Review). Active rules can be used without user approval (however the user 930 still has an option to reject them), whereas inactive rules are waiting for user approval in order to be used. For example, the rules created by a user 105 and STOP_COLLECTING rules created by Batch Noise Detection 324 can be inactive, whereas other rules created by Batch Noise Detection 324 can be active. In an embodiment of the disclosure, a user with elevated privileges, such as an Admin 930, can access the Pending Rules List 902 to review the rules. The admin can reject 903 a rule, which updates the rule's status to Inactive 906 or confirm 904 a rule, updating its status to Active 907. In some cases, certain rules, such as those created by admin 930, may not require manual review and can be Auto-confirmed 905, which automatically sets their status to Active 907. All the status updates are reflected in the Data Knowledge Repository 360.

Active Rules 908 are retrieved from Data Knowledge Repository 360 and can be used by Pre-collection Filtering 302 of the Agent 301, which uses the rules with noise category of STOP_COLLECTING to skip data collection if the scope matches to the defined scope of the rule. Additionally, it can be used in Analytical Module 330 to filter out noisy changes if the scope is matching.

Additionally, active rules 908 can be utilized by the Learning Component 350 in conjunction with Long-Term Data Storage 323. The Learning component 350 consists of three engines: the Rule-Pattern Learning Engine 351, the Feedback Learning Engine 352, and the Batch Preprocessing Learning Engine 353. The Rule-Pattern Learning Engine 351 encompasses the following tasks: Rule Generalization 911 and Rule Creation 912.

Rule Generalization 911 analyzes existing active rules to potentially generate a more generalized version. FIG. 10 comprises tables 1000 and 1010 for providing rule generalizations examples, according to an embodiment of the disclosure. In an embodiment of the disclosure, table 1000 depicts rules, where the parameter ACCEPTSTOP is observed across multiple hosts within the same environment and path. This indicates that a generalized rule should apply to any CI 200, which could be represented with the following scope:

CI: *
Environment: Microsoft Windows 2019
Path: */Drivers/*
Parameter: ACCEPTSTOP Another example is depicted in Table 1010 in FIG. 10. If we assume that all parameters under the path */Drivers/* in the Microsoft Windows 2019 environment are listed in the Parameter column, we can derive a broader rule that encompasses every parameter under this path:

CI: host 1
Environment: Microsoft Windows 2019
Path: */Drivers/*
Parameter: *

Once a rule is induced, it is assigned a status of Pending review 920 (with an option of Active while Pending review or Inactive while Pending review), saved to Data Knowledge Repository 360, and added to Pending rules list 902, waiting for the admin user 930 to evaluate. Furthermore, users have the option to enable auto-confirmation for such rules through the Rule-Pattern Learning Engine 351.

Another task of Rule-Pattern Learning Engine 351 is Rule creation 912. The input to this task are current active rules, changes, configuration data, and other data such as change request tickets, retrieved from Long-Term Data Storage 323. This data can be processed by different algorithms, such as genetic algorithms, generative AI, and others, to generate new potential rules. The status of each newly created rule is set to Pending review (with an option of Active while Pending review or Inactive while Pending review), the rule is categorized Pending rule 920 and stored in the Data Knowledge repository 360.

Another engine of Learning Component 350 is Feedback Learning engine 352. This engine enhances the current mechanisms of Batch Noise Detection 324 and Runtime Noise Detection 332 to better accommodate with the User's 105 Custom Rules 343 describing noise. For example, if User 105 frequently creates rules with noise type MACHINE_GENERATED, which the existing Machine Generated 612 mechanism fails to detect, the Feedback Learning Engine 352 can modify its configuration settings or algorithms to identify these missing rules as machine generated. The inferred updates are recorded as a rule of different type than noise rules for configurations or changes, and undergo the same approval process as other changes.

Alternatively, in the case of Cascading Change Detection 705, when a new file is added, it reports every parameter associated with that file. If User 105 creates a rule for every parameter except the file name with noise category CASCADING_CHANGE, the Feedback Learning Engine 352 learns from this input (that only the file name should be reported when adding a new file) and creates a Pending rule 920 with a similar type as for Machine Generated 612. Like other rules, this one also follows the same approval process.

The final engine in the Learning Component 352, called Batch Preprocessing Learning Engine 353, enhances efficiency in noise detection of Batch Noise Detection 324. This engine generates new rules for two processes: Object Identification 641 and Normalization 642. By analyzing configuration entries 207 across similar CIs 200 or environments 201, it can infer rules to identify items uniquely and standardize paths and parameters.

For example, when comparing multiple XML entries in Object Identification 641, the engine analyzes similar XML files to identify the optimal sub-element or combination of sub-elements that can uniquely identify each entry. For Normalization, it examines paths across environments 201 of the same type in order to determine which segments of the path could be standardized. After the rules are generated, an admin user 930 has the option to either confirm 904 or reject 903 these rules as needed.

Technical Effects

In an embodiment of the disclosure, the Noise Reduction Mechanisms on Configuration Data in IT Systems primarily enhances data quality, system efficiency, and decision-making reliability. The technical effects it achieves are the following.

Improved Data Quality Through Real-Time Noise Filtering

In an embodiment of the disclosure, system 100 filters noise on different levels. First, the collections of noisy data can be skipped. Next, by applying Batch Noise Detection, a broader scope for determining noisy configurations is applied. Finally, in Runtime Noise Detection, the noise is filtered out in real time by applying context-aware, rule-based mechanisms. Using all these noise filtering mechanisms, the system can identify irrelevant data, mark it as irrelevant and in the case of rules for an agent, not store such data.

EXAMPLES

Frequent, Non-Impactful Value Changes: Network monitoring can frequently record a device's status as "online" or "offline". If a device briefly loses connection and quickly reconnects, toggling between the values might not require attention. By filtering these repetitive changes, noise reduction provides a clearer focus on meaningful connectivity issues.

Dynamic Resource Consumption Metrics: Metrics like CPU utilization and memory usage often fluctuate within a certain range. By using noise reduction to filter out these expected fluctuations (e.g., 50%±5%), users receive alerts only when utilization reaches a threshold that might indicate a potential issue.

Log File Generation Patterns: System logs generate files with unique timestamps each time a log is created. By identifying these machine-generated patterns as noise, such redundant data can be excluded.

Removal of Temporary Files or Directories: Temporary files such as tmp, debug, or backup directories are frequently created and deleted. By filtering out these temporary files, the noise reduction ensures only relevant changes are shown. Whitespace and Order Differences in Lists: Configurations listing IP addresses might display them in different orders or with minor whitespace variations. Noise reduction marks these differences as noise, presenting a consistent view focused on actual list content rather than format.

Benefits

The benefit of these mechanisms is that the system outputs high-quality, refined data for downstream processes, ensuring that only relevant and accurate information is presented (and stored in some cases), improving data integrity across the lifecycle and it can lead to quicker, more informed decision-making.

Reduction of Data Processing Load

By minimizing noisy data at the collection stage, the system reduces unnecessary data accumulation, lowering both storage and processing demands, and minimizing network usage. The Pre-collection Filtering by the agent can significantly reduce the data load that reaches the storage and analytical part of the system.

EXAMPLES

Lower Data Storage Requirements: By skipping the data from the agent's data collection, the system reduces the volume of stored data.

Efficient Network Bandwidth Usage: Filtering out noise before data is transmitted across the network reduces the amount of data transferred. This reduction applies to data exchanges between server and agent, as well as between server and front-end component (if the front-end component is hosted on a different server and data being sent excludes the noisy changes), ensuring only relevant data is transmitted and noisy changes are excluded.

Reduced Load on Analytical Modules: By pre-filtering noisy data before it reaches analytical modules, the system cuts down the workload for runtime analysis and other algorithms used for data analysis, such as machine learning models. This focus on high-impact data means that algorithms and analyses run more effectively, as they don't need to account for or learn from irrelevant fluctuations.

Selective Monitoring Saves System Resources: Rules like STOP_COLLECTING prevent unnecessary data collection from noisy or low-priority environments, allowing system resources to focus on critical areas. This selective monitoring conserves CPU and memory on monitoring agents, extending system longevity and performance.

Improved Resource Allocation for Key Insights: Since less CPU and memory are spent on processing noisy data, resources can be reallocated to support complex analyses and machine learning tasks. This focus allows for higher-quality insights and models, which ultimately support better decision-making.

Benefits

The benefits are reduced data loads, which leads to lower CPU, memory and storage consumption, enhancing system performance. This efficiency is particularly valuable for real-time applications, where resources can be optimized for processing critical data, reducing latency and improving overall response times.

Enhanced System Adaptability Through Learning Mechanisms

The Learning Component automatically adapts noise detection rules based on evolving data patterns and user feedback. With the Pattern Learning Engine, the system generalizes the rules or creates new rules dynamically by incorporating historical data and user input.

Benefits

The benefit of this Learning component is that adaptive noise detection keeps the system relevant in changing environments, reducing maintenance requirements and making noise filtering more precise over time without requiring users to manually create rules.

Enhanced Decision-Making Accuracy for Automated and User-Driven Systems)

By filtering the irrelevant noise from the data, system 100 enhances decision-making for systems relying on automation and for human users involved in real-time or critical decision processes. This refined data is directly used in decision making algorithms and dashboards, which can operate on meaningful patterns rather than being misled by data with high variability but low relevance, leading to better predictive outcomes and insights.

EXAMPLES

1. Improved Decision-Making in Automated Systems

Enhanced Algorithm Accuracy: Filtering out noise ensures that machine learning models and rule-based algorithms use only accurate, consistent data, which minimizes misinterpretations. For example, in automated monitoring, noise reduction eliminates inconsequential parameter shifts, allowing the system to focus on actual anomalies, thereby improving anomaly detection models' precision and reducing false positives.

Reduced Computational Overhead: When processing high volumes of data, filtering out noise saves computational resources, enabling the system to make faster decisions. For instance, if the system doesn't need to process redundant log entries or frequent but minor configuration toggles, it can allocate resources to more impactful data processing, accelerating decision-making timelines.

Increased Relevance of Alerts and Responses: By focusing only on meaningful changes, noise reduction helps automated systems trigger alerts or responses based on genuine issues rather than incidental data. For example, in an automated alerting system for IT infrastructure, only significant configuration changes trigger alerts, reducing "alert fatigue" and allowing for more effective automated responses or escalations.

Enhanced Training Data for ML Models: Machine learning models built on clean, noise-free data yield better predictions and more reliable decisions. Noise reduction ensures that models are trained on relevant data patterns, enhancing their performance and minimizing the risk of poor decisions due to exposure to misleading data.

2. Enhanced Decision-Making for Human-in-the-Loop Systems

Clear Prioritization of Issues: By filtering out noise, the system presents users with prioritized, actionable data, allowing them to make informed decisions faster. For example, if only major configuration changes or impactful metrics shifts are displayed, users can focus on critical issues without being distracted by irrelevant updates, enabling prompt and effective decision-making.

Reduced Analysis Paralysis: When users are presented with filtered, high-quality data, they experience less cognitive overload, leading to quicker decisions and reducing the risk of indecision caused by irrelevant information. Additionally, it also leads to lower needs for manual filtering. For instance, a cybersecurity analyst receives only meaningful threat alerts, which enables them to respond faster without wading through low-risk alerts. For new or infrequent users providing clean and concise data the system lowers the learning curve.

Increased Confidence in Data Quality: Users can trust that the data they are reviewing has already been filtered for accuracy and relevance, which reduces second-guessing and enhances decision confidence. For example, in quality control, if users know that the data excludes known noise patterns, they can focus on investigating only the most pertinent quality deviations.

Enhanced User-Feedback Integration for Continual Improvement: In human-in-the-loop systems, feedback from users on noise rules helps continually refine what is flagged as noise, improving the relevance of future data. For instance, if operators consistently filter out certain types of repetitive changes, this feedback can help the system learn and automatically suppress similar changes, leading to more refined decision-making data over time.

Better Strategic Insights: When only relevant data is retained, it's easier to derive trends and patterns that inform strategic decisions, like infrastructure upgrades, software optimizations, or resource allocation adjustments. Users reviewing filtered data can quickly identify recurring issues or patterns that might be lost in unfiltered data.

3. Synergies Between Automated and Human-in-the-Loop Decision-Making

Collaborative Filtering for Enhanced Precision: Automated systems can apply noise reduction initially, followed by human review to verify or adjust filters. This synergy refines data quality over time, enabling both machine learning models and human operators to make better decisions. For example, automated pre-filtering catches predictable noise, while users confirm or reject nuanced cases, continually improving the system's overall decision-making accuracy.

Streamlined Escalation Pathways: Noise-free data ensures that only meaningful issues escalate from automated systems to human operators, making workflows more efficient. For instance, if an alerting system passes only validated critical changes, the likelihood of escalated alerts requiring human intervention aligns with genuine priority, aiding faster resolutions and more effective use of resources.

4. Better User Experience

Improved Visual Layout with Cleaner Data: Since only the most relevant data is presented, the user interface can focus on better visualizations for core metrics, trends, and summaries. Cleaner data also allows for simpler dashboards and graphs, improving data interpretation and interaction.

Streamlined Reporting for Targeted Insights: When generating reports, users see only meaningful changes, with noisy data already filtered out. This streamlining makes reports more concise and actionable, reducing the time users spend on analysis and enhancing the overall quality of reporting outputs.

Efficient Workflows with Reduced Manual Filtering: Users don't have to manually sort through noisy data to find relevant information, as noise reduction automates this step. This efficiency saves time and allows users to focus directly on tasks requiring their expertise, improving overall productivity.

Consistent and Predictable Data Display: The system can generalize noise reduction rules, ensuring that commonly noisy data like machine-generated files or cascading deployment changes are consistently filtered out across all environments. This consistency gives users a reliable, predictable data view, helping them stay confident and focused.

Less Intrusive Learning Process for Noise Rules: With intelligent learning components that adjust noise rules over time based on user feedback, users experience a system that "learns" their preferences without frequent disruptions. The improved accuracy over time also means users spend less time setting and adjusting filters.

Enhanced Collaboration through Clearer Data Presentation: Since noisy, irrelevant data is filtered out, teams can collaborate more effectively with a shared, clean view of data and configurations. This clarity prevents miscommunication and helps team members align quickly on decisions.

More Relevant Notifications Based on Real Needs: Users can choose to receive notifications only for high-impact events, reducing disruptions from frequent or low-priority changes. This selectivity leads to a smoother, more user-centered notification experience, supporting focused work rather than constant context-switching.

Benefits

Its benefit is that automated processes experience fewer false positives, which improves response accuracy, and humans experience reduced cognitive load, which enhances focus and decision making speed. The user experience is more engaging, efficient, and effective.

Improved Efficiency and Scalability of Data-Driven Operations

The system is designed for scalability in both single-instance and distributed environments by reducing unnecessary data traffic. Filtering mechanisms reduce redundant data exchange across networked resources, making the system lighter and more adaptable in scaling scenarios. Pre-filtering already reduces the amount of data that is sent from the agent over the network to the server. Additionally, Batch Noise Detection and Runtime Noise Detection can reduce the amount of data that is sent to the UI (by not sending noisy changes) or to report, especially if the Front-end Module is hosted on another server.

Benefits

In large-scale environments or with high-frequency data collection, this reduces network load and enhances data processing efficiency.

Increased Data Consistency for Model Training and Analysis

By filtering noisy data before storage or analysis, system 100 ensures that any of the machine learning models and statistical analyses are trained on consistent, high-quality data. This significantly improves the reliability and robustness of analytical and predictive models.

EXAMPLES

Improved Model Accuracy: Algorithms trained on noise-free data have better predictive power because they focus on meaningful patterns rather than random or inconsequential changes. For instance, a machine learning model that identifies system anomalies will yield more accurate predictions when it's trained on data stripped of toggling, whitespace, or order differences.

Reduced Training and Processing Time: Pre-filtering noisy data lowers the data volume that machine learning models and analytical algorithms must process. This reduction shortens training times, decreases computational load, and allows real-time algorithms to perform faster with higher efficiency, directly benefiting applications requiring rapid response times.

Enhanced Feature Relevance: Noise detection mechanisms filter out noisy data, allowing algorithms to focus on genuinely impactful features. This helps to avoid feature dilution, where irrelevant features decrease the model's ability to identify relevant patterns in the data.

Less Overfitting: With noise removed, algorithms are less likely to memorize insignificant patterns (overfit) and more likely to generalize from the data, which enhances performance when they encounter new data. For example, anomaly detection algorithms are more robust and less prone to flagging false positives when trained on filtered data.

More Efficient Hyperparameter Tuning: Reduced data noise enables faster and more reliable hyperparameter tuning, as tuning processes aren't skewed by random fluctuations. Algorithms can reach optimal configurations more quickly, lowering computational costs and improving overall model accuracy.

Lower Dimensionality: By removing noise-related features, algorithms work with lower-dimensional data, enhancing computational efficiency. This not only saves memory but also helps models converge faster during training or execution.

Improved Pattern Detection: Complex algorithms, such as clustering or pattern-recognition models, perform better with fewer, high-quality data points. Removing cascading and redundant changes (such as multiple parameter updates resulting from a single file change) makes true patterns more visible, leading to more accurate clustering and grouping.

Enhanced Stability and Consistency: Algorithms that rely on consistency, like time-series forecasting, become more accurate when trained on stable, noise-free data. With fewer fluctuations from irrelevant changes, such as whitespace or order differences, these models produce more reliable forecasts and predictions.

Reduced Resource Costs for AI/ML Workloads: With less data noise to process, machine learning models can run on fewer computational resources, lowering infrastructure costs. For high-frequency data pipelines, this translates to notable reductions in processing and memory needs.

Higher-Quality Data Augmentation and Transfer Learning: For models using transfer learning, where patterns learned from one dataset are applied to another, noise-free data ensures that learned patterns are meaningful. This improves model adaptability and accuracy across different data sets and domains.

Enhanced Explainability: Algorithms built on clean data produce clearer, more interpretable outputs. When data is less noisy, it's easier to understand model decisions, identify key influencers, and provide insights that are easier for users to understand and trust.

Benefits

This benefits with cleaner input data, models have higher predictive accuracy and reduced error rates, which enhances their utility in critical applications like forecasting, anomaly detection, and trend analysis.

In summary, system 100 delivers technical advancements in data quality, resource utilization, and analytical reliability through a robust noise reduction framework. This enables efficient, adaptive, and accurate data management across automated and user-driven processes, contributing to streamlined operations and improved scalability.

SUMMARY OF ELEMENTS IN THE DRAWINGS

FIG. 1 shows:

100—A schematic illustration of a computerized system

200—A host or a computer on which an agent (301) is installed

103—Network over which host (200) can communicate with Server (310)

310—Server that includes following modules Data Ingestion and Processing module (320), Analytical module (330), Front-end Module (340), and Learning component (350) along with two data libraries: Long-term data storage (323) and Data Knowledge Repository (360)

105—User requesting data from Server (310) via Front-end Module (340)

106—Report file

FIG. 2 shows:

200—Configuration item or host

201—Environments that reside on the CI (200). Environments (201) can be nested (e.g. one environment (201) can have multiple environments (201), some of which can have additional environments (201), . . . )

203—CIs (200) or environments (201) contain configuration data (203), which consists of one or multiple configuration entries (207), which are composed of path (204), parameter (205) and value (206).

FIG. 3 shows:

300—Detailed architecture of Noise Reduction Mechanism

301—Agent residing on CI (200) is responsible for collecting data from this CI and is composed of Pre-collection Filtering (302), Data Collection Module (303), and Agent Safeguard Mechanisms (304).

310—Server processes data received from Agent (301) and consists of the Data Ingestion and Processing Module (320), Analytical Module (330), Front-end Module (340), Data Knowledge Repository (360), and Learning Component (350)

320—Data Ingestion and Processing Module is responsible for ingesting and processing data sent from Agent (301). It consists of Server Load Protection (321), Data Processing (322), Long-Term Data Storage (323), and Batch Noise Detection (324).

330—Analytical Module is responsible for accessing and querying the data. It consists of Data Access and Query Engine (331), and Runtime Noise Detection (332).

340—Front-end Module is responsible for serving data to an end user (105) or exporting it to a report (106). It consists of Reporting (341), UI (342), and Custom Rules (343).

350—Learning Component is responsible for learning from the existing data and consists of Rule-Pattern Learning Engine (351), Feedback Learning Engine (352), Batch Preprocessing Learning Engine (353).

360—Data Knowledge Repository that contains rules describing noise in configurations.

FIG. 4 shows:

301—agent with detailed mechanisms of collecting the data

302—Pre-collection filtering.

303—Data Collection Module that consists of Collection Instructions (401), Agent Scheduler (402), Collector (403), Collected Configuration data (404)

360—Data Knowledge Repository

304—Agent Safeguard Mechanism that performs quality check of transaction, and it can consist of multiple mechanisms, such as Data Completeness Check (410), Length Check (411), Expected Configuration Type (412), Cross-field Validation (413), Range Check (414), Allow Empty Fields (415), Format Check (416), Threshold Check (417), Uniqueness Check (418), and CI and Configuration Structure (419)

420—Transaction that is the result of Agent Safeguard Mechanism (304) and contains differences on configuration data in comparison with previous scan.

FIG. 5 shows:

321—Server Load Protection that receives multiple transactions (420) that are the result of Agent Safeguard Mechanism (304); and can contain Transaction size (500), Number of environments (501), Maximum collection time (502), Number of configuration entries (503), Maximum number of environments per host (504), and other additional mechanisms (505). Server Load Protection Mechanism (321) outputs Approved transaction (510)

322—Data Processing that processes the Approved transaction (510) and saves it into Long Term Data Storage (323).

FIG. 6 shows:

323—Long term data Storage, from which the configuration data (203) from different CIs (200) or environments (201) are retrieved

324—Batch Noise Detection that consists of Server Scheduler (600), which is responsible for executing the task Batch Noise Detection (324) on a schedule; Preprocessing (640), Configuration Pattern Detection (601) and CI Patterns Detection (602)

601—Configuration Patterns Detection which can consist of multiple mechanisms, such as Matching Scope to Existing Rules (610), Matching Pattern (611), Machine Generated (612), Folder Added/Removed (613), Configuration with Frequent Sibling Changes (614), Toggling (615), High Frequency (616), Runtime (617)

602—CI Patterns Detection which can consist of multiple mechanisms, such as Matching Pattern (630), CI and Environment Limit (631), Cross-Environment Configurations (632), and Unexpected Data Volume (633).

620—Rules that are the output of Batch Noise Detection (324) and are persisted in the Data Knowledge Repository (360).

FIG. 7 shows:

105—User that requests changes via UI (342) or via Reporting (341) tool.

331—Data Access & Query Engine that pulls requested data from Long-Term Data Storage (323). For each requested environment (201) there can be multiple changes (700)

332—Runtime noise detection that checks whether a specific Change (700) contains noise based on the following mechanisms: Filtering (701), User-defined patterns/tags (702), Insignificant relative change (703), Internal change detection (704), Cascading change detection (705), Whitespace diff (706), Order diff (707), Installation specific (708).

720—Changes (720) are split into two subsets: those flagged as noisy by runtime rules (710) and those that are not noisy (711). When a report (106) is generated, only not noisy Changes (711) are included. However, User (105) can access both noisy changes (710) and not noisy changes (711) via the UI (342), where additional filtering based on runtime rules can be applied if needed.

FIG. 8 shows:

800—An example of a Data Knowledge repository that contains the following columns Scope (801), Noise Category (802), Created by (803), Status (804), and Last Modified (805).

801—Column Scope that describes the configuration scope by providing CI (200), Environment (201), Path (204), Parameter (205).

FIG. 9 shows:

105—User who adds new Custom Rule(s) (343) via UI (342). Additionally Batch Noise Detection (324) can create Rules (620). Custom Rules (343) and Rules (602) have status Pending Review, therefore creating Pending rule 920. Pending rule 920 is saved in Data Knowledge Repository 360, and it goes to Pending rules list 902.

902—rules from Pending rules list can be rejected (903) and status set to inactive (906), confirmed (904) or auto-confirmed (905) and set status to active (907). The rejection and confirmation can be done by the user who has higher privileges (such as administrator (930))

360—Data Knowledge Repository, where rules with their status are saved. This data can be used in Agent (301) for Pre-collection filtering (302) or in Analytical module (330) for Runtime Noise Detection (332)

908—Active rules are pulled from Data Knowledge Repository (360) and are used as an input for the Learning Component (350) in addition to the data from Long-Term Data Storage (323).

350—Learning Component that consists of Rule-pattern Learning engine (351), Feedback Learning Engine (352) and Batch Preprocessing Learning Engine (353)

351—Rule-Pattern learning engine can create new, more generalized rules from active rules with Rule Generalization (911) or creates new rules with Rule creation (912), where the resulting rules have status of Pending rule (920).

352—Feedback Learning Engine can adapt the specific existing mechanism used for detecting noise, such as Machine Generated (612), Cascading Change Detection (705), Insignificant Relative Change (703), others (910) to make better predictions

353—Batch Preprocessing Learning Engine can create new rules for Object Identification (641) and for Normalization (642).

FIG. 10 shows:

1000—A table with an example for rule generalization.

1010—A table with an example for rule generalization.

In an embodiment of the disclosure, an application for dynamic filtering and tuning of IT configuration data is stored on a non-transitory storage medium, such as a DVD, CD, external USB disk, disk-on key or other storage medium. The medium may be provided to a general-purpose computer to be executed to serve as server 310 and provide the above described services.

It should be appreciated that the above-described methods and apparatus may be varied in many ways, including omitting or adding elements or steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present invention is not limited to what has been particularly shown and described hereinabove. Rather the scope of the present invention is defined only by the claims, which follow.

We claim:

1. A method of noise reduction in configuration data of an IT system, comprising:

collecting configuration data from configuration items in a network of the IT system with agents;

transmitting the collected configuration data to a server for processing;

blocking receipt of selected configuration data by a server load protection module to protect the server from overload by hazardous content;

storing the configuration data at the server in a long-term data storage;

processing the configuration data with a batch noise detection module that identifies noise in the configuration data and suppresses non-desired configuration data; the batch noise detection module deduces rules based on the identified noise and stores the rules in a data knowledge repository;

receiving a user query from a user using a front-end module of the server to identify configuration data related to problems in the IT system;

analyzing the configuration data stored in the long-term data storage with an analytical module to transform the configuration data to be aligned with the user query;

responsive to the analysis applying a runtime noise detection module to identify and suppress transformed configuration data that are identified as noise to remove irrelevant transformed configuration data from a list of transformed configuration data provided in response to the user query.

2. The method of claim 1, wherein the agent determines what configuration data to collect with a pre-collection filtering module that excludes collection of configuration data from problematic sources based on rules from the data knowledge repository.

3. The method of claim 1, wherein the agent determines what configuration data of the collected configuration data to transmit to the server with an agent safeguard mechanism module that filters out problematic configuration data with quality problems.

4. The method of claim 3, wherein the agent safeguard mechanism module assesses the quality of the collected configuration data by triggering various mechanisms including a data completeness check, a length check, an expected configuration type, cross-field validation, a range check, allowing empty fields, a format check, a threshold check, a uniqueness check, and a CI and configuration structure check; wherein for each of the various mechanisms the user can modify parameters and/or enable disable the mechanism.

5. The method of claim 1, wherein the front-end module includes a user interface that enables a user to create custom noise rules for use by the batch noise detection module and runtime noise detection module.

6. The method of claim 1, wherein the server includes a learning component, which is enabled to generalize existing rules from the data knowledge repository and store them back in the data knowledge repository.

7. The method of claim 1, wherein the batch noise detection module utilizes several mechanisms to identify specific types of noise in the configuration data and wherein for each of the various mechanisms the user can modify parameters and/or enable disable the mechanism.

8. The method of claim 7, wherein the mechanisms include checking if a path, parameter or value of a configuration entry in the configuration data is machine generated or if files within a specific folder are frequently added and removed.

9. The method of claim 1, wherein the batch noise detection module utilizes several mechanisms to identify specific types of noise at a specific configuration item and forms a rule that encompasses all the configuration data associated with the specific configuration item.

10. The method of claim 1, wherein the runtime noise detection module identifies a group of configuration data that reflects deletion of an environment and deletion of sub environments of the environment; the runtime noise detection module reports the configuration data reflecting deletion of the environment and suppresses the configuration data reflecting deletion of the sub environments.

11. A non-transitory computer readable medium comprising an executable program configured to perform the method of claim 1.

12. A computer system for reducing noise in configuration data in an IT system, comprising:

agents in a network of the IT system for collecting configuration data from the configuration items;

a server comprising a processor and memory to process the configuration data;

wherein the agents are programmed to transmit the collected configuration data to the server for processing;

wherein the server is programmed to perform the following:

blocking receipt of selected configuration data by a server load protection module to protect the server from overload by hazardous content;

storing the configuration data at the server in a long-term data storage;

processing the configuration data with a batch noise detection module that identifies noise in the configuration data and suppresses non-desired configuration data; the batch noise detection module deduces rules based on the identified noise and stores the rules in a data knowledge repository;

receiving a user query from a user using a front-end module of the server to identify configuration data related to problems in the IT system;

analyzing the configuration data stored in the long-term data storage with an analytical module to transform the configuration data to be aligned with the user query;

responsive to the analysis applying a runtime noise detection module to identify and suppress transformed configuration data that are identified as noise to remove irrelevant transformed configuration data from a list of transformed configuration data provided in response to the user query.

13. The method of claim 1, wherein the agent determines what configuration data to collect with a pre-collection filtering module that excludes collection of configuration data from problematic sources based on rules from the data knowledge repository.

14. The system of claim 12, wherein the agent determines what configuration data of the collected configuration data to transmit to the server with an agent safeguard mechanism module that filters out problematic configuration data with quality problems.

15. The system of claim 14, wherein the agent safeguard mechanism module assesses the quality of the collected configuration data by triggering various mechanisms including a data completeness check, a length check, an expected configuration type, cross-field validation, a range check, allowing empty fields, a format check, a threshold check, a uniqueness check, and a CI and configuration structure check; wherein for each of the various mechanisms the user can modify parameters and/or enable disable the mechanism.

16. The system of claim 12, wherein the front-end module includes a user interface that enables a user to create custom noise rules for use by the batch noise detection module and runtime noise detection module.

17. The system of claim 12, wherein the server includes a learning component, which is enabled to generalize existing rules from the data knowledge repository and store them back in the data knowledge repository.

18. The system of claim 12, wherein the batch noise detection module utilizes several mechanisms to identify specific types of noise in the configuration data and wherein for each of the various mechanisms the user can modify parameters and/or enable disable the mechanism.

19. The system of claim 18, wherein the mechanisms include checking if a path, parameter or value of a configuration entry in the configuration data is machine generated or if files within a specific folder are frequently added and removed.

20. The system of claim 12, wherein the batch noise detection module utilizes several mechanisms to identify specific types of noise at a specific configuration item and forms a rule that encompasses all the configuration data associated with the specific configuration item.

* * * * *